United States Patent
Chandrakasan et al.

(10) Patent No.: US 10,651,687 B2
(45) Date of Patent: May 12, 2020

(54) DETUNING FOR A RESONANT WIRELESS POWER TRANSFER SYSTEM INCLUDING CRYPTOGRAPHY

(71) Applicant: Massachusetts Institute of Technology, Cambridge, MA (US)

(72) Inventors: Anantha P. Chandrakasan, Belmont, MA (US); Nachiket V. Desai, Cambridge, MA (US); Chiraag Juvekar, Cambridge, MA (US); Shubham Chandak, Menlo Park, CA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 103 days.

(21) Appl. No.: 15/892,158

(22) Filed: Feb. 8, 2018

(65) Prior Publication Data
US 2019/0245385 A1  Aug. 8, 2019

(51) Int. Cl.
| | |
|---|---|
| H02J 50/12 | (2016.01) |
| H02J 50/90 | (2016.01) |
| H02J 50/80 | (2016.01) |
| H04L 9/00 | (2006.01) |
| H04L 9/32 | (2006.01) |
| H04L 9/06 | (2006.01) |

(52) U.S. Cl.
CPC .............. *H02J 50/12* (2016.02); *H02J 50/80* (2016.02); *H02J 50/90* (2016.02); *H04L 9/006* (2013.01); *H04L 9/0662* (2013.01); *H04L 9/3271* (2013.01); *H04L 2209/80* (2013.01)

(58) Field of Classification Search
CPC .. H02J 50/10; H02J 50/12; H02J 50/40; H02J 50/80; H02J 50/90; H04L 9/006; H04L 9/0662; H04L 9/3271; H04L 2209/80; H04B 5/00; H04B 5/0025; H04B 5/0031; H04B 5/0037; H04B 5/0075; H04B 5/0093
See application file for complete search history.

(56) References Cited

U.S. PATENT DOCUMENTS

| | | |
|---|---|---|
| 5,608,306 A | 3/1997 | Rybeck et al. |
| 6,100,663 A | 8/2000 | Boys et al. |

(Continued)

FOREIGN PATENT DOCUMENTS

| | | |
|---|---|---|
| CN | 103346591 A | 10/2013 |
| WO | WO 01/03288 A1 | 1/2001 |

(Continued)

OTHER PUBLICATIONS

Ahn et al. "Effect of Coupling Between Multiple Transmitters or Multiple Receivers on Wireless Power Transfer", IEEE Transactions on Industrial Electronics, vol. 60 No. 7, Jul. 2013, 12 pages.

(Continued)

*Primary Examiner* — Hal Kaplan
(74) *Attorney, Agent, or Firm* — Daly, Crowley, Mofford & Durkee LLP

(57) ABSTRACT

A method and apparatus for achieving detuning for a resonant wireless power transfer system including cryptography is described. Detuning for a resonant wireless power transfer system including cryptography allows for detuning a wireless receiver based upon authentication between the wireless receiver and a wireless charger.

28 Claims, 16 Drawing Sheets

(56) References Cited

U.S. PATENT DOCUMENTS

| | | |
|---|---|---|
| 6,844,755 B2 | 1/2005 | Ajit |
| 6,975,092 B2 | 12/2005 | Edington et al. |
| 7,276,857 B2 | 10/2007 | Logsdon et al. |
| 7,474,062 B2 | 1/2009 | Boys et al. |
| 7,522,878 B2 | 4/2009 | Baarman |
| 7,605,496 B2 | 10/2009 | Stevens et al. |
| 7,633,235 B2 | 12/2009 | Boys |
| 7,639,514 B2 | 12/2009 | Baarman |
| 7,675,197 B2 | 3/2010 | Tetlow |
| 7,781,916 B2 | 8/2010 | Boys |
| 8,050,068 B2 | 11/2011 | Hussmann et al. |
| 8,076,801 B2 | 12/2011 | Karalis et al. |
| 8,093,758 B2 | 1/2012 | Hussmann et al. |
| 8,183,938 B2 | 5/2012 | Boys et al. |
| 8,290,649 B2 | 10/2012 | Iwashita et al. |
| 8,294,555 B2 | 10/2012 | Tetlow |
| 8,667,452 B2 | 3/2014 | Verghese et al. |
| 9,077,261 B2 | 7/2015 | Yamamoto |
| 9,287,719 B2 | 3/2016 | Katsunaga et al. |
| 9,768,732 B2 | 9/2017 | Briffa et al. |
| 9,819,272 B2 | 11/2017 | Perreault et al. |
| 10,038,461 B2 | 7/2018 | Briffa et al. |
| 10,164,472 B2 | 12/2018 | Chandrakasan et al. |
| 2006/0274469 A1 | 12/2006 | Nielsen |
| 2008/0067874 A1 | 3/2008 | Tseng |
| 2009/0174263 A1 | 7/2009 | Baarman et al. |
| 2009/0302933 A1 | 12/2009 | Boys et al. |
| 2010/0045114 A1 | 2/2010 | Sample et al. |
| 2010/0148723 A1 | 6/2010 | Cook et al. |
| 2011/0090723 A1 | 4/2011 | Hu et al. |
| 2011/0117860 A1 | 5/2011 | Kimball |
| 2011/0193417 A1 | 8/2011 | Hirasaka et al. |
| 2011/0234011 A1 | 9/2011 | Yi et al. |
| 2011/0241437 A1 | 10/2011 | Kanno |
| 2011/0248571 A1 | 10/2011 | Kim et al. |
| 2011/0254379 A1 | 10/2011 | Madawala |
| 2011/0266882 A1 | 11/2011 | Yamamoto et al. |
| 2011/0299313 A1 | 12/2011 | Hussmann et al. |
| 2011/0304216 A1 | 12/2011 | Baarman |
| 2012/0002446 A1 | 1/2012 | Madawala et al. |
| 2012/0038220 A1 | 2/2012 | Kim et al. |
| 2012/0049640 A1 | 3/2012 | Ichikawa et al. |
| 2012/0049642 A1 | 3/2012 | Kim et al. |
| 2012/0091989 A1 | 4/2012 | Uramoto et al. |
| 2012/0146425 A1 | 6/2012 | Lee et al. |
| 2012/0161538 A1 | 6/2012 | Kinoshita et al. |
| 2012/0223590 A1 | 9/2012 | Low et al. |
| 2012/0242164 A1 | 9/2012 | Teggatz et al. |
| 2012/0242284 A1 | 9/2012 | Wheatley, III et al. |
| 2012/0306284 A1 | 12/2012 | Lee et al. |
| 2012/0306285 A1 | 12/2012 | Kim et al. |
| 2013/0070621 A1 | 3/2013 | Marzetta et al. |
| 2013/0076154 A1 | 3/2013 | Baarman et al. |
| 2013/0093390 A1 | 4/2013 | Partovi |
| 2013/0099807 A1 | 4/2013 | Wheeland et al. |
| 2013/0113299 A1 | 5/2013 | Von Novak et al. |
| 2013/0181536 A1 | 7/2013 | Bhargawa et al. |
| 2013/0207468 A1 | 8/2013 | Wu et al. |
| 2013/0229065 A1 | 9/2013 | Robertson et al. |
| 2013/0272044 A1 | 10/2013 | Boys et al. |
| 2013/0300357 A1 | 11/2013 | Mercier et al. |
| 2013/0310630 A1 | 11/2013 | Smith et al. |
| 2014/0021795 A1 | 1/2014 | Robertson et al. |
| 2014/0028110 A1 | 1/2014 | Petersen et al. |
| 2014/0097791 A1 | 4/2014 | Lisuwandi |
| 2014/0159500 A1 | 6/2014 | Sankar et al. |
| 2015/0180265 A1 | 6/2015 | Chiang et al. |
| 2015/0200601 A1 | 7/2015 | Sagneri et al. |
| 2015/0236757 A1 | 8/2015 | Lee et al. |
| 2015/0333800 A1 | 11/2015 | Perry et al. |
| 2016/0043562 A1 | 2/2016 | Lisi et al. |
| 2016/0043590 A1 | 2/2016 | Ha et al. |
| 2016/0064997 A1 | 3/2016 | Hur et al. |
| 2017/0040831 A1 | 2/2017 | Desai et al. |
| 2017/0118543 A1 | 4/2017 | Ha et al. |
| 2017/0126071 A1 | 5/2017 | Aioanei |
| 2019/0165573 A9 | 5/2019 | Perreault et al. |

FOREIGN PATENT DOCUMENTS

| | | |
|---|---|---|
| WO | WO 2009/111597 A2 | 9/2009 |
| WO | WO 2009/111597 A3 | 9/2009 |
| WO | WO 2009/149464 A2 | 12/2009 |
| WO | WO 2012/037279 A1 | 3/2012 |
| WO | WO 2012/112703 A1 | 8/2012 |
| WO | WO 2013/006068 A1 | 1/2013 |
| WO | WO 2013/059300 A2 | 4/2013 |

OTHER PUBLICATIONS

AirFuel Resonant Wireless Power Transfer (WPT) System Baseline System Specification (BSS), AirFuel Alliance, May 3, 2017, 88 pages.

Azarderakhsh et al. "Efficient Algorithm and Architecture for Elliptic Curve Cryptography for Extremely Constrained Secure Applications", IEEE Transactions on Circuits and Systems.I: Regular Papers, vol. 61, No. 4, Apr. 2014, 12 pages.

Baker et al. "Feedback Analysis and Design of RF Power Links for Low-Power Bionic Systems" IEEE Transactions on Biomedical Circuits and Systems, vol. 1, No. 1 Mar. 2007, 11 pages.

Batina et al. "An Elliptic Curve Processor Suitable For RFID-Tags" Nov. 2016, 17 pages.

Bernstein et al. "Analysis and Optimization of Elliptic-Curve Single-Scalar Multiplication," Contemporary Mathematics, vol. 461, No. 461, Jan. 2008, 19 pages.

Beth et al. "Algorithm engineering for public key algorithms," IEEE Journal on Selected Areas in Communication, vol. 7, No. 4, May 1989, 9 pages.

Texas Instruments "BQ26100 SHA-J/HMAC Based Security and Authentication IC With SDQ Interface", Jun. 2006, 29 pages.

Cannon et al. "Magnetic, resonant coupling as a potential means for wireless power transfer to multiple small receivers", IEEE, Transactions om power Electronics, vol. 24, Jul. 2009, 7 pages.

Casanova et al. "A loosely coupled planar wireless power system for multiple receivers," IEEE, Transactions on industrial Electronics, vol, 56. No. 8, Aug. 2009, 9 pages.

Cheng et al. "A 6.78 MHz 6 W Wireless Power Receiver with a 3-level 1 x / ½x I0x Reconfigurable Resonant Regulating Rectifier", IEEE, International Solid-State Circuits Conference Jan./Feb. 2016, 3 pages.

Choi et al. "A Current-Mode Wireless Power Receiver with Optimal Resonant Cycle Tracking for Implantable Systems," IEEE Int. Solid-State Circuits Conference (ISSCC) Dig. Tech. Papers Jan./Feb. 2016, 3 pages.

Desai et al. "A ZVS Resonant Receiver with Maximum Efficiency Tracking for Device-To-Device Wireless Charging", IEEE, Solid-State Circuits Conf. (ESSCIRC), Sep. 2016, 4 pages.

Desai et al. "An Actively Detuned Wireless Power Receiver with Public Key Cryptographic Authentication and Dynamic Power Allocation", IEEE International Solid-State Circuits Conference, Sep. 7, 2017, 3 pages.

Desai "Circuits for Efficient and Secure Power Delivery in Distributed Applications", Massachusetts Inst. Technology, Feb. 2017, 167 pages.

Dietz "Battery Authentication for Portable Power Supplies", Power Electron. Technology, vol. 32, No. 4, Apr. 2006, 8 paged.

Digital Signature Standard (DSS), document FIPS PUB 186-4, NIST, Jul. 2013, 130 pages.

Doughty et al. "A General Discussion of Li Ion Battery Safety", Electrochem. Soc. Interface. vol. 21. No. 2, Jun. 2012. 8 pages.

Furtner et al. "BIF-Battery interface Standard for Mobile Devices." in Proc. Custom Integrated Circuits Conf. (CICC). Sep. 2013, 8 pages.

Hwang et al. "An All-In-One (Qi, PMA and A4WP) 2.5 W Fully Integrated Wireless Battery Charger IC for Wearable Applications", IEEE Int. Solid-State Circuits Conf. (ISSCC) Dig. Tech. Papers, Jan./Feb. 2016, 3 pages.

(56) References Cited

OTHER PUBLICATIONS

Juvekar et al. "A Keccak-Based Wireless Authentication Tag with Per-Query Key Update and Power-Glitch Attack Countermeasures," in IEEE Int. Solid-State Circuits Conf. (ISSCC) Dig. Tech. Papers. Jan./Feb. 2016, 3 pages.

Kurs et al. "Wireless Power Transfer Via Strongly Coupled Magnetic Resonances", Science, vol. 317, No. 5834, Jul. 2007, 5 pages.

Lee et al. "Efficient Power-Analysis-Resistant Dual-Field Elliptic Curve Cryptographic Processor Using Heterogeneous Dual-Processing-Element Architecture", IEEE Transactions on Very Large Scale Integration (VL5I) Syst., vol, 22, No. I, Jan. 2014, 13 pages.

Li et al. "Wireless Power Transfer System Using Primary Equalizer for Coupling- And Load-Range Extension in Bio-Implant Applications," in IEEE Int. Solid-State Circuits Conference (ISSCC) Dig. Tech. Papers, Feb. 2015, 3 pages.

Moh et al. "A Fully Integrated 6W Wireless Power Receiver Operating at 6.78 MHz with Magnetic Resonance Coupling", IEEE, International Solid-State Circuits Conference (ISSCC) Dig. Tech. Papers, Feb. 2015. 3 pages.

Pessl et al. "Curved Tags-A Low-Resource ECDSA Implementation Tailored for RFID", in Proc. Iilt. Workshop Radio Freq. Identification., Secur. Privacy Issues (RFIDSec), Nov. 15, 2014, 17 pages.

Reyhani-Masoleh "Efficient Algorithms and Architectures for Field Multiplication Using Gaussian Normal bases", IEEE Transactions on Computers, vol. 55, No. I, Jan. 2006, 14 pages.

Roy et al. "Lightweight Coprocessor for Koblitz Curves: 283-Bit ECC Including Scalar Conversion with Only 4300 Gates", in Proc. Cryptography Hardw. Embedded Syst., Sep. 2015, 21 pages.

Solinas "Efficient Arithmetic on Koblitz Curves", in Towards 702 a Quarter-Century Public Key Cryptography. Boston, MA, USA: Springer, Mar. 2000, 55 pages.

E. Wenger, "Hardware Architectures for MSP430-Based Wireless Sensor Nodes Performing Elliptic Curve Cryptography", in Proc. Int. Conf. Appl. Cryptograph. Netw. Secur., Jun. 2013, 17 pages.

Xing et al. "Battery Management Systems in Electric and Hybrid Vehicles", Energies, vol. 4, No. 11, Oct. 31, 2011, 18 pages.

Zaghib et al "Safe and Fast-Charging Li-Ion Battery with Long Shelf Life for Power Applications" J. Power Sources. vol. 196, No. 8, Apr. 2011, 6 pages.

PCT International Search Report dated May 8, 2019 for International Application No. PCT/US19/15814; 3 Pages.

PCT International Written Opinion dated May 8, 2019 for International Application No. PCT/US19/15814; 6 Pages.

U.S. Appl. No. 15/892,155, filed Feb. 8, 2018, Chandrakasan, et al.

Desai, et al.; "A Resonant Receiver with Maximum-Efficiency Tracking for Device-to-Device Wireless Charging;" 2.02; MTL Annual Research Conference 2016, Session 2: Circuits and Systems; Poster and Abstract; Jan. 21, 2016; 2 Pages.

Desai et al., "A ZVS Resonant Receiver with Maximum Efficiency Tracking for Device-To-Device Wireless Charging," 42$^{nd}$ European Solid-State Circuits Conference (ESSCIRC); Sep. 2016; 4 Pages.

Desai, et al.; "A Resonant Receiver with ZVS and Maximum Efficiency Tracking for Device-to-Device Wireless Charging;" MTL Center for Integrated Circuits and Systems (CICS); PowerPoint Presentation/Research Review; Nov. 4, 2015; 17 Pages.

Desai, et al.; "An Actively Detuned Wireless Power Receiver with Public Key Cryptographic Authentication and Dynamic Power Allocation"; IEEE Journal of Sold-State Circuits; vol. 53; No. 1; Jan. 1, 2018; 11 Pages.

Desai; "Circuits for Efficient and Secure Power Delivery in Distributed Applications"; Massachusetts Institute of Technology; Thesis; Feb. 1, 2017; 96 Pages.

Desai, et al.; "Device-to-Device Wireless Charging with Maximum Efficiency Tracking;" MIT Wireless Workshop 2015; Poster; Mar. 20, 2015; 1 Page.

Desai, et al.; "Energy-Efficient Wireless Power Transmitters and Receivers;" MTL Annual Research Report 2015; http://www.mtl.mit.edu/research/annual_reports/2015/circuits.pdf; Aug. 1, 2015; 1 Page.

Jin, et al.; "Rapid Wireless Charging with an Energy-Constrained Source;" SuperURP; MIT, EECS; Poster Displayer at Poster Session Dec. 6, 2012; 1 page.

Jin, et al.; "Wirelessly Charging Portable Electronics Using Mobile Devices;" Power Point Presentation; http://video.mit.edu/watch/wireless-charging-with-an-energy-constrained-source-presented-by-superurop-student-rui-jin-13573/; Jan. 17, 2013; 9 pages.

Kendir, et al.; "An Optimal Design Methodology for Inductive Power Link With Class-E Amplifier;" IEEE Transactions on Circuits and Systems—I: Regular Papers; vol. 52; No. 5; May 2005; pp. 857-866; 10 pages.

Kim, et al.; "Design of a Contactless Battery Charger for Cellular Phone;" IEEE Transactions on Industrial Electronics; vol. 48; No. 6; Dec. 2001; pp. 1238-1247; 10 pages.

Li, et al.; "A Maximum Efficiency Point Tracking Control Scheme for Wireless Power Transfer Systems Using Magnetic Resonant Coupling;" IEEE Transactions on Power Electronics; vol. 30; No. 7; Jul. 1, 2015; 11 pages.

National Institute of Standards and Technology (NIST), "Digital Signature Standard (DSS)," Information Technology Laboratory; Document FIPS PUB 186-4, Federal Information Processing Standards Publication; Jul. 2013; 130 Pages.

New York Times; "Push for Standard Cellphone Charger Gains Ground;" Article in http://www.nytimes.com/2009/02/17/technology/17iht-chargers.4.20250284.html?_r=0 published on Nov. 7, 2009; 1 Page.

PCT International Preliminary Report dated Feb. 15, 2018 for International Application No. PCT/US2016/045082; 12 Pages.

PCT International Search Report and Written Opinion dated Apr. 23, 2015 for International Application No. PCT/US2014/066268; 9 Pages.

PCT International Preliminary Report on Patentability dated Jun. 7, 2016 for International Application No. PCT/US2014/066268; 6 Pages.

PCT Search Report and Written Opinion of the ISA for PCT/US/2012/060590 dated Apr. 15, 2013 (WO 2013/059300 A2); 10 pages.

PCT Search Report of the ISA for PCT Appl. No. PCT/US2016/045082 dated Oct. 21, 2016; 3 pages.

PCT Written Opinion of the ISA for PCT Appl. No. PCT/US2016/045082 dated Oct. 21, 2016; 10 pages.

PCT International Search Report and Written Opinion dated May 8, 2019 for International Application No. PCT/US19/15814; 9 Pages.

Sokal; "Class-E Switching-Mode High-Efficiency Tuned RF/Microwave Power Amplifier: Improved Design Equations;" Microwave Symposium Digest; IEEE MTT-S International; pp. 779-782; vol. 2; Jun. 1, 2000; 4 pages.

Wang, et al.; "Design and Analysis of an Adaptive Transcutaneous Power Telemetry for Biomedical Implants;" IEEE Transactions on Circuits and Systems—I: Regular Papers; vol. 52; No. 10; Oct. 1, 2005; pp. 2109-2117; 9 pages.

Restriction Requirement dated May 29, 2018 for U.S. Appl. No. 15/223,378; 7 Pages.

Response to Restriction Requirement dated May 29, 2018 for U.S. Appl. No. 15/223,378; Response filed Jul. 12, 2018; 1 Page.

U.S. Non-Final Office Action dated Oct. 18, 2018 for U.S. Appl. No. 15/223,378; 23 Pages.

Response to U.S. Non-Final Office Action dated Oct. 18, 2018 for U.S. Appl. No. 15/223,378; Response filed Jan. 14, 2019; 13 Pages.

U.S. Final Office Action dated Mar. 26, 2019 for U.S. Appl. No. 15/223,378; 17 Pages.

Response to U.S. Final Office Action dated Mar. 26, 2019 for U.S. Appl. No. 15/223,378; Response and RCE filed on Jun. 24, 2019; 14 Pages.

U.S. Non-Final Office Action dated Oct. 5, 2017 for U.S. Appl. No. 14/911,599; 15 Pages.

Response to U.S. Non-Final Office Action dated Oct. 5, 2017 for U.S. Appl. No. 14/911,599; Response filed Dec. 18, 2017; 12 Pages.

U.S. Final Office Action dated Feb. 6, 2018 U.S. Appl. No. 14/911,599; 8 Pages.

Response to U.S. Final Office Action dated Feb. 6, 2018 U.S. Appl. No. 14/911,599; Response filed on Aug. 6, 2018; 7 Pages.

Notice of Allowance dated Aug. 30, 2018 for U.S. Appl. No. 14/911,599; 5 Pages.

(56) References Cited

OTHER PUBLICATIONS

PCT International Search Report dated Apr. 26, 2019 for International Application No. PCT/US19/15811; 3 Pages.
PCT International Written Opinion dated Apr. 26, 2019 for International Application No. PCT/US19/15811; 8 Pages.
Notice of Allowance dated Aug. 21, 2019 for U.S. Appl. No. 15/223,378; 20 Pages.

DETUNING FOR A RESONANT WIRELESS POWER TRANSFER SYSTEM INCLUDING CRYPTOGRAPHY

GOVERNMENT RIGHTS

This invention was made with Government support under Contract No. FA8721-05-C-0002 awarded by the U.S. Air Force. The Government has certain rights in the invention.

BACKGROUND

As is known in the art, the rapid growth of Internet of Things (IoT) devices has led to a corresponding growth in the adoption of near-field wireless charging for various applications. However, as the number of wireless power receivers grows, so will the number of wireless charging circuits and devices (collectively "chargers") that might be not strictly standards compliant or not intended or appropriate for use with a particular device (collectively "counterfeit" chargers). Given the critical nature of at least some tasks performed by IoT devices, protecting IoT devices from harsh transient signals (or more simply "transients") imposed by counterfeit wireless chargers is crucial for at least several reasons not including the need to avoid damage to the devices due to such harsh transients. These transients could have potentially destructive impacts on both the receiver's electronics and the battery being charged. This further raises the challenge that underdamped LC resonant tank circuits (or more simply "tanks") used by at least some resonant wireless power transmission (WPT) systems tend to cause overvoltage or overcurrent conditions in response to the transients imposed by counterfeit chargers.

Secure hash algorithm (SHA)-based cryptographic authentication protocols have been implemented commercially for the purpose of avoiding a device using a potentially damaging charger (i.e. a counterfeit wireless charger). These solutions use a receiver-based cryptographic element in the device to be charged that generates a so-called "challenge" (i.e. a request for authentication) using a predetermined key. A charger having an appropriate key can then decrypt and respond to that challenge. The receiver in the device to be charged is open circuited until it receives the correct response, upon which the device to be charged begins drawing energy from the charger.

While a similar challenge-response protocol for charger authentication could be employed for incorporating secure charging into WPT, this protocol is only well-suited to a one-charger, one-receiver scenario. The projected scale of IoT wireless power receivers in the near future would require multiple receivers with multiple chargers, in such scenarios authentication based upon a pre-shared secret (symmetric key) would be unsustainable and unscalable. Symmetric key authentication between the receiver and the charger requires that the receiver either be pre-programmed with the private keys of all possible chargers or be capable of exchanging a new key upon encountering a new charger. Such an authentication process requires all chargers and receivers share a master key that facilitates the key exchange over the same communication channel, thus introducing a weak point into the system.

Conversely, public key authentication uses two separate keys—a publicly known key used by the receiver for generating the challenge (public key) and its associated private key that is known only to the charger and is used for generating the response. The distribution of the charger public keys can be handled by issuing certificates signed by a trusted certificate authority, in a way similar to the key-exchange handshake implemented in the transport layer security (TLS) protocol.

In a scenario where, multiple receivers are coupled to the same charger, the power delivered to a receiver is a strong function of its proximity and orientation (which is related to the magnetic coupling coefficient) with respect to the charger coil, with more power going to the closer receiver. This physically imposed constraint might not necessarily reflect the actual energy requirements of the various receivers.

SUMMARY

A method and apparatus for achieving detuning for a resonant wireless power transfer system including cryptography is described. Detuning for a resonant wireless power transfer system including cryptography allows for detuning a wireless receiver based upon authentication between the wireless receiver and a wireless charger.

In accordance with one aspect of the concepts described herein a method for wireless power authentication comprises emitting an authentication challenge from a first inductive element to a wireless charger proximate to the wireless receiver; validating a response from the wireless charger. The method may further comprise adjusting a resonant frequency of the main inductive element according to the validated response.

The method may further include one or more of the following features either taken individually or in any combination: wherein the main inductive element is further configured to receive the response from the wireless charger; wherein the main inductive element is wirelessly coupled to an auxiliary inductive element; wherein adjusting the resonant frequency comprises adjusting an impedance presented to an auxiliary inductive element of the wireless receiver; wherein adjusting the impedance comprises determining a duty cycle based upon the validated response; and adjusting a duty cycle of a rectifier coupled to the auxiliary inductive element according to the determined duty cycle; adjusting the impedance presented to the auxiliary inductive element to be effectively open when the response is valid; adjusting the impedance presented to the auxiliary inductive element to be effectively closed when the response is invalid; wherein a plurality of public keys is stored in the wireless receiver; wherein the response comprises a comparison of at least one of the plurality of public keys to a plurality of private keys; waiting for the response for a predetermined amount of time; and emitting a second authentication challenge from the first inductive coil of the wireless receiver to the wireless charger after the predetermined amount of time has elapsed; wherein the wireless receiver further comprises an envelope detector; detecting an output signal of the envelop detector to determine that the wireless charger is within a range of the wireless receiver.

In accordance with a further aspect of the concepts described herein, a wireless power receiver for use within a wireless resonant inductive power transfer system, the wireless power receiver comprises a first inductive coil coupled to a digital authentication engine. The wireless power receiver may further include a second inductive coil coupled to an auxiliary rectifier, wherein an impedance of the auxiliary rectifier is adjusted according to the digital authentication engine.

The wireless power receiver may further comprise one or more of the following features either taken individually or in any combination: wherein the first inductive coil is physically larger than the second inductive coil; wherein a resonant frequency of the first inductive coil is dependent upon the impedance of the auxiliary rectifier; wherein the first inductive coil is configured to emit an authentication challenge generated by the digital authentication engine; wherein the auxiliary rectifier is further coupled to a duty-cycle control circuit, wherein the duty-cycle control circuit is configured to adjust the duty cycle of the auxiliary rectifier; wherein the duty-cycle control circuit is configured to adjust the duty cycle of the auxiliary rectifier according to an acknowledgement generated by the digital authentication engine; wherein the digital authentication engine is configured to validate a response received at the first inductive coil; further comprising an envelope detector, wherein the envelope detector is configured to demodulate a response received at the first inductive coil; wherein the first inductive coil is one of a plurality of main inductive coils; wherein the second inductive coil is one of a plurality of auxiliary inductive coils; a resonant frequency of the first inductive coil is based upon at least one impedance presented to at least one of plurality of auxiliary coils; a communication engine configured to communicate to at least one other wireless power receiver; further comprising a main rectifier coupled to the first inductive coil; further comprising a load coupled to the main rectifier and the auxiliary rectifier, wherein the main rectifier and the auxiliary rectifier are configured to charge the coupled load; a communication engine, wherein the communication engine is configured to provide a power need of the load to at least one other wireless receiver; wherein the at least one other wireless receiver is in proximity to a wireless charger.

BRIEF DESCRIPTION OF THE DRAWINGS

The foregoing features of the disclosure, as well as the disclosure itself may be more fully understood from the following detailed description of the drawings, in which.

DETAILED DESCRIPTION

This application shares subject matter with U.S. patent application Ser. No. 15/892,155 entitled "Detuning for a Resonant Wireless Power Transfer System Including Cooperative Power Sharing," filed concurrently with the present application on Feb. 8, 2018, and hereby incorporated by reference in its entirety.

Figure 1:
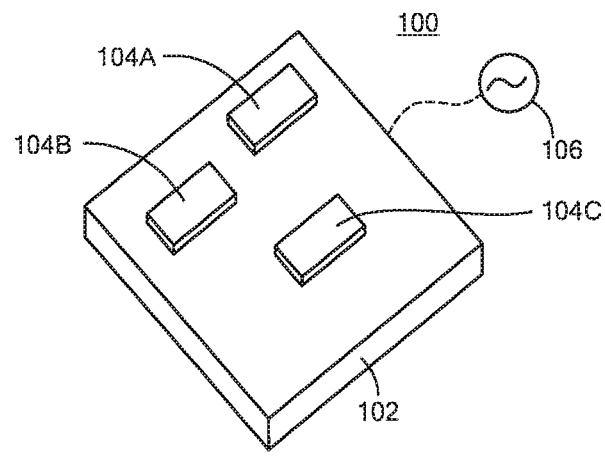
FIG. 1 is an isometric view of a plurality of devices to be wirelessly charged disposed on a structure which functions as a wireless power charger.

Referring now to FIG. 1, a wireless power transfer transmitter 102 (also referred to herein as a "wireless power charger" or more simply as a "wireless charger") has disposed thereon one or more (here three) wireless power transfer receivers (also referred to herein as "wireless receivers" or "devices to be charged") 104A-C. Wireless charger 102 is here shown as a "pad," but other wireless charger structures may, of course, also be used.

As will be explained in detail below, the wireless charger 102 and the devices to be charged 104 are configured to achieve wireless resonant charging. Thus, wireless charger 102 and one or more devices to be charged 104 are said to form a wireless resonant charging system.

It is important to note that the system 100 may include any number of wireless chargers 102 and wireless receivers 104. While in some embodiments the number of wireless receivers 104 is greater than the number of wireless transmitters 102 (such as in the illustrative embodiment of FIG. 1), in other embodiments the number of wireless receivers 104 may be fewer than or equal to the number of transmitters 102.

Wireless charger 102, may comprise, for example, an object with a flat surface (such as a mat), a printed circuit board (PCB), dongle, device case, or any combination thereof—to name a few examples. Wireless charger 102 includes a tank circuit (comprising at least one capacitor, at least one resistor, and at least one inductive element (e.g. an inductive coil), or any or any combination thereof) connected to a power source 106. According to some embodiments, power source 106 may comprise an alternating current ("AC") power source, such as a wall outlet providing, for example, 120V at 60 Hz, 220V at 50 Hz, 230V at 50 Hz, 100V at 50/60 Hz, or any combination thereof, to name a few. In other embodiments, power source 106 may comprise an AC output of one or more power convertors or a series of power convertors such as invertors, half-bridge rectifiers, full-bridge rectifiers, transformers, or any combination thereof—to name a few examples. In some embodiments, the power convertors or series of power convertors may be located within wireless charger 102, while in other embodiments, the power convertors or series of power convertors may be external to wireless charger 102.

Wireless charger 102 is configured to wirelessly deliver power to at least one of wireless receivers 104 through resonant inductive power transfer. While in the illustrative embodiment of FIG. 1, wireless charger 102 is delivering power to three wireless receivers 104, in other embodiment wireless charger 102 may deliver power to more or fewer receivers 102.

Current from power source 106 is provided to the inductive element of wireless charger 102, as current flows through the inductive coil of wireless charger 102, the inductive coil emits or otherwise generates a magnetic field. Further, the inductive element of wireless charger 102 resonates at a frequency. The frequency at which the inductive element of wireless charge 102 resonates is determined by the configuration of the tank circuit of the wireless charger 102, for example the effective inductance, capacitance, and resistance of the tank circuit. As an example, the resonant frequency of the inductive element of wireless charger 102 may be determined by the inductance of the inductive element and the capacitance values of the capacitors within the tank circuit of wireless charger 102.

As the inductive element of wireless charger 102 resonates at a frequency, coupling occurs between the inductive element of charger 102 and one or more other inductive elements within a range of the inductive element of wireless charger 102. These other inductive elements resonate at the same or different frequencies from wireless charger 102. The strength of the coupling between the inductive element of charger 102 and the other inductive elements is determined by the difference between the frequency at which the inductive element of charger 102 resonates and the frequency at which the other inductive element resonates. Coupling between the inductive elements strengthens as the frequencies approach one another in value (i.e. the frequency at which the inductive element of wireless charger 102 resonates becomes closer in value to the frequency at which the other inductive element resonates) and weakens when the frequencies diverge from one another in value (i.e. the frequency at which the inductive element of wireless charger 102 resonates becomes more disparate in value from the frequency at which the other inductive element resonates). The strongest coupling between the inductive element of wireless charger 102 and another inductive element occurs when both resonate at the same frequency—i.e. the other inductive element is "tuned" to the frequency of the inductive element of the wireless charger 102, or vice versa.

Because the inductive element of wireless charger 102 is resonating at a frequency when it establishes a magnetic field, the established magnetic field is spread over the coupling between the inductive element of wireless charger 102 and one or more other inductive elements, rather than spread omni-directionally. The strength (i.e. the magnetic flux density) of the magnetic field spread over the coupling is dependent upon the strength of the coupling, with a stronger coupling providing a stronger magnetic field to a coupled inductive element and a weaker coupling providing a weaker magnetic field to a coupled inductive element.

Wireless receivers 104A-C may each comprise, for example, a device case, a PCB, a dongle, or any combination thereof—to name a few examples. Each wireless receiver 104 includes at least one tank circuit (each comprising at least one capacitor, at least one resistor, and at least one inductive element) and is coupled to a load, or target. The load may comprise, for example, the battery of a mobile device (such as a cellular phone, tablet, smartphone, Bluetooth device, portable speaker, or any combination thereof—to name a few examples), a portable computer, a vehicle, or any combination thereof—to name a few examples.

Each inductive element of wireless receivers 104 is further configured (or "tuned") to resonate at a frequency. The frequency at which the inductive elements of receivers 104 resonate is determined by the configuration of the tank circuit of each respective receiver 104, for example the effective inductance, capacitance, and resistance of the tank circuits. As an example, the resonant frequency of an inductive element of a wireless receiver 104 may be determined by the inductance values of the inductive coils and the capacitance values of the capacitors within a tank circuit of a wireless receiver 104.

As discussed above, when one or more inductive elements enter a range of wireless charger 102, coupling occurs between the inductive elements and the inductive elements of wireless charger 102. The range of wireless charger 102 comprises the distance that wireless charger 102 may spread the established magnetic field over the resonant coupling. For example, wireless charger 102 may spread the established magnetic field up to a distance of effectively three to four inches over resonant coupling. According to some embodiments, the range is of an order of a physical size of the charging coil. As a wireless receiver 104 enters a range of wireless charger 102, coupling occurs between the inductive element of wireless charger 102 and the inductive element of wireless receiver 104.

Further, as discussed above, the strength of the coupling between the inductive element of wireless charger 102 and another inductive element is dependent upon the difference in the resonant frequencies of the inductive elements. According to some embodiments, the inductive element of charger 102 may be tuned to resonate at a so-called "charging frequency." Because coupling between the inductive element of wireless charger 102 and another inductive element is strongest when the inductive elements are tuned to the same frequency, the charging frequency comprises the frequency at which the inductive element of charger 102 resonates—in other words, the frequency at which other inductive elements need to be tuned to ensure maximum coupling with the inductive element of wireless charger 102.

According to some embodiments, the strength of the coupling between the inductive element of wireless charger 102 and the inductive element of wireless receiver 104 depends on the difference between the resonant frequency of the inductive element of wireless receiver 104 and the charging frequency, i.e. stronger coupling occurs as the resonant frequency of the inductive element of wireless receiver 104 approaches the charging frequency. The strength of the coupling between the inductive element of wireless charger 102 and the inductive element of wireless receiver 104 further depends on the orientation and location of wireless receiver 104 with respect to wireless charger 102. For example, the strength of the coupling between wireless charger 102 and a wireless receiver 104 may be dependent upon the distance between wireless charger 102 and wireless receiver 104 and also the angle of wireless receiver 104 with respect to wireless charger 102 (and more particularly, the angle of the inductive element in the wireless receiver relative to the inductive element in the wireless charger). According to some embodiment, the angle is measured as the angle made by a plane of the inductive element wireless receiver 104 with respect to a plane of the inductive element of wireless charger 102.

Once coupling occurs between the inductive element of wireless charger 102 and the inductive element of wireless receiver 104, the magnetic field established by charger 102 is spread to the inductive element of the wireless receiver 104 over the coupling. As the magnetic field is spread over the coupling, the magnetic field excites an AC current within the inductive element of the wireless receiver 104. In other words, the inductive element of the wireless receiver 104 acts as an AC energy source upon coupling to wireless charger 102. The amount of current provided by the inductive element of wireless receiver 104 is determined by the strength (i.e. magnetic flux density) of the magnetic field spread to the inductive element of wireless receiver 104. In some embodiments, the AC current provided to the load coupled to the wireless receiver 104 to, for example, charge the load.

According to some embodiments, each wireless receiver 104A-C may further comprise power convertors to convert the AC current generated by its inductive element into DC power before it is delivered to the load to, for example, charge a load that requires a DC power source to charge. As some examples, each wireless receiver 104A-C may comprise a half-bridge rectifier, a whole-bridge rectifier, voltage regulators, linear regulators, or any combination thereof—to name a few examples.

According to some embodiments, wireless charger 102 may couple to (and thus deliver power to) wireless receivers 104 while wireless receivers 104 are in contact in wireless charger 102 (such as in the illustrative embodiment of FIG. 1), in other embodiments, wireless charger 102 may couple to wireless receivers 104 not in contact with wireless charger 102. For example, in some embodiments, wireless charger 102 may deliver power to wireless receivers 104 up to 4 meters away from wireless charger 102.

Figure 2:
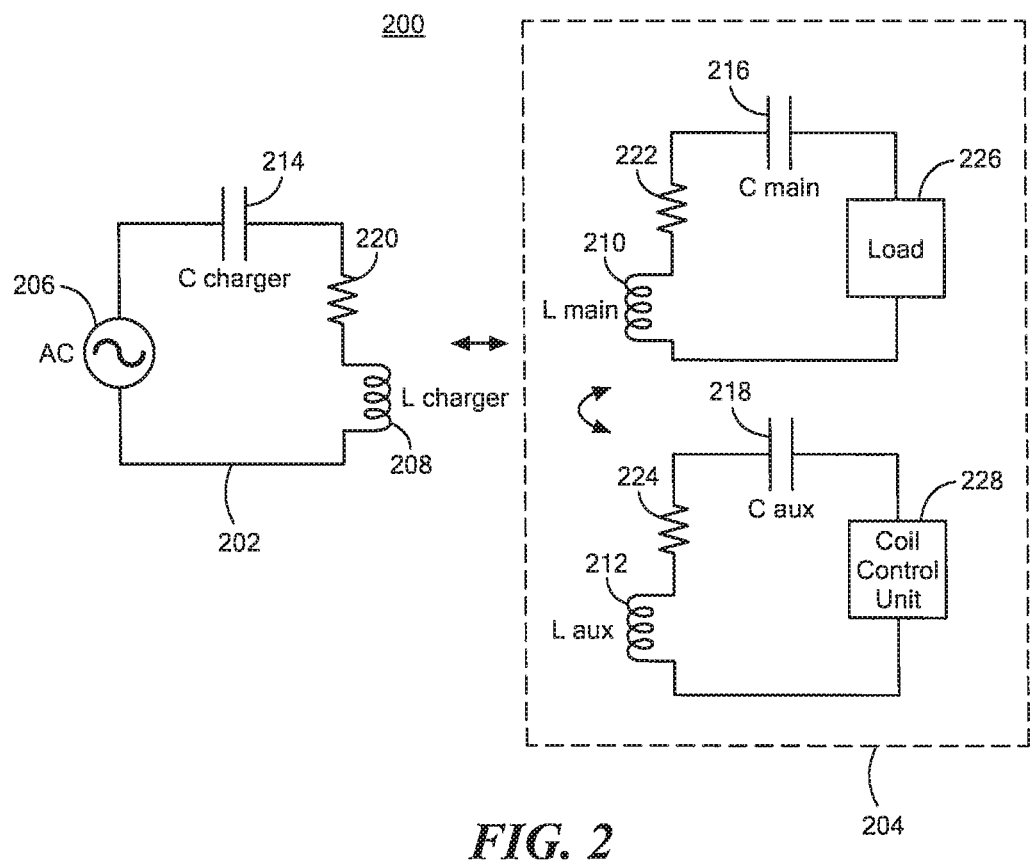
FIG. 2 is a block diagram of a wireless power charger and a wireless power receiver which form a wireless resonant charging system.

Referring now to FIG. 2, a wireless charging system 200 includes a wireless charger 202 comprising a tank circuit and wireless power receiver 204 comprising a main tank circuit and an auxiliary tank circuit both coupled to a load 206. As discussed above, the wireless charger tank circuit comprises a capacitor $C_{charger}$ 214, resistor 220 and an inductive coil $L_{charger}$ 208 coupled to a voltage source 206, where $L_{charger}$ 208 resonates at a frequency according to the tank circuit, specifically according to the capacitance of $C_{charger}$ 214.

Wireless receiver 204 comprises a main tank circuit, comprising a capacitor $C_{main}$ 216, resistor 222, and a main inductive element here shown as a coil $L_{main}$ 210, and an auxiliary tank circuit comprising capacitor $C_{auxiliary}$ 218, resistor 224, coupled to load 226, and auxiliary inductive element, here shown as a coil $L_{auxiliary}$ 212 coupled to a control circuit 228 which corresponds to a coil control circuit when the inductive elements are provided as coils. The control circuit 228 is configured to control the impedance coupled to auxiliary tank circuit as discussed in detail below with reference to FIG. 3.

The inductive element $L_{main}$ is configured to resonate, or be tuned, to a desired frequency (also referred to herein as a "main frequency"). Because the resonant frequency of $L_{main}$ is determined by the main tank circuit, to achieve this desired frequency, the value of inductive element $L_{main}$ is selected in conjunction with the main tank circuit, specifically according to the capacitance value of a capacitive element $C_{main}$. The inductive element $L_{auxiliary}$ is configured to resonant, or be tuned, to a second desired frequency (also referred to herein as an "auxiliary frequency"). Because the resonant frequency of $L_{auxiliary}$ is determined by the auxiliary tank circuit, to achieve this second desired frequency, the value of inductive element $L_{auxiliary}$ is selected in conjunction with the auxiliary tank circuit, specifically the capacitance of capacitive element $C_{auxiliary}$. In other words, inductive element $L_{main}$ is tuned according to the main tank circuit while inductive element $L_{auxiliary}$ is tuned according to the auxiliary tank circuit.

As discussed above, when a wireless receiver is within range of a wireless charger, the inductive element of a wireless receiver couples to the inductive element of the wireless charger so that power may transfer wirelessly between the two components (i.e. the charger and the receiver) via a spread magnetic field. Similarly, when the wireless receiver is within range of the wireless charger, inductive elements $L_{main}$ and $L_{auxiliary}$ couple with $L_{charger}$ so that wireless power transfer may occur between the wireless charger and the wireless receiver via the magnetic field spread to $L_{main}$ and $L_{auxiliary}$.

As discussed above, the strength of coupling between inductive elements (such as $L_{main}$ and $L_{charger}$ and $L_{auxiliary}$ and $L_{charger}$) is controlled, in part, by the difference in resonant frequency, or tuning, between the inductive elements, for example the difference between the resonant frequency $L_{charger}$ and $L_{main}$ or the difference between $L_{charger}$ and $L_{auxiliary}$. The strength of the coupling between inductive elements may further be controlled by the physical size of each respective inductive element, the number of turns in each respective inductive element, the proximity of the inductive elements relative to each other, the impedance coupled to each inductive element, the orientation of each inductive element relative to each other, or any combination thereof—to name a few examples.

Further, $L_{main}$ and $L_{auxiliary}$ are coupled due to the resonant nature of both inductive elements. The strength of the coupling between the inductive elements $L_{main}$ and $L_{auxiliary}$ is controlled, in part, by the resonant frequency of each inductive element, the physical size of each inductive element, their proximity with respect to each other, their orientation with respect to each other, or any combination thereof—to name a few examples. In the illustrative embodiment of FIG. 2, due to the close proximity of inductive elements $L_{main}$ and $L_{auxiliary}$, the coupling between $L_{main}$ and $L_{auxiliary}$ results in a "strong coupling" and while the coupling between $L_{charger}$ and $L_{main}/L_{auxiliary}$ results in a "weak coupling." That is to say, the strength of the coupling between $L_{main}$ and $L_{auxiliary}$ is much greater than that of $L_{charger}$ and $L_{main}/L_{auxiliary}$. For example, in the illustrative embodiment of FIG. 2, the coupling between $L_{main}$ and $L_{auxiliary}$ is approximately four or more times greater than that of $L_{charger}$ and $L_{main}/L_{auxiliary}$.

In some embodiments, the strength of the coupling between a wireless charger and wireless receiver (e.g. the coupling between inductive elements $L_{charger}$ and $L_{main}$) may further be controlled by the strength of the coupling between elements $L_{main}$ and $L_{auxiliary}$. Specifically, the resonant frequency of $L_{main}$ is adjusted according to the strength of the coupling between $L_{main}$ and $L_{auxiliary}$. The coupling between $L_{main}$ and $L_{auxilimy}$ is dependent upon an impedance shown to the auxiliary tank circuit, as discussed in further detail below with reference to FIG. 3.

The control circuit (e.g. coil control circuit) of the wireless receiver controls the impedance presented to the auxiliary tank circuit. As the impedance presented to the auxiliary tank circuit changes, so does the strength of the coupling between $L_{main}$ and $L_{auxiliary}$, and thus the resonant frequency of $L_{main}$. Therefore, adjusting the impedance connected to the auxiliary tank circuit may alter the resonant frequency of $L_{main}$ to increase the difference between $L_{main}$ and $L_{charger}$, thus altering the strength of the coupling between $L_{main}$ and $L_{charger}$—in other words, detuning $L_{main}$ from $L_{charger}$. This is discussed in further detail below with reference to FIG. 3.

Coupling between two inductive coils may be represented by the following equation:

$$L(s) = \frac{-s^2 M^2}{z_1(s) z_2(s)} \quad [\text{EQ 1}]$$

And further:

$$z_1(s) = sL_1 + R_1 + \frac{1}{sC_1} \quad [\text{EQ 2}]$$

$$z_2(s) = sL_2 + R_2 + \frac{1}{sC_2} + R_L \quad [\text{EQ 3}]$$

Wherein L(s) represents the feedback loop transfer (i.e. power transfer) between the wireless coils, $z_1(s)$ represents the impedance seen by the first inductive coil, $z_2(s)$ represents the impedance seen by the second inductive coil, and M represents the mutual inductance between the two coils.

A coupling coefficient k between the two inductive coils is defined as:

$$k = m/\sqrt{L_1 L_2} \quad [\text{EQ4}]$$

The loop transfer function gain can be directly modulated by k.

As the coupling coefficient increases, the closed-loop system poles first move towards each other along a circle centered at the origin (with the same resonant frequency). Upon increasing k further, they split, leading to the formation of two separate natural modes in the system, which move further and further apart. If instead, the two LC tanks are tuned at separate frequencies, both the closed loop poles and their associated resonant frequencies immediately begin to move apart as k is increased.

Open-circuiting the load connected to a wireless receiver serves to block power from the charger makes the wireless receiver invisible to the charger, because the back electromotive force (EMF) generated at the charger ($L_1$), $sMI_2$, is zero. Short circuiting the load connected to the wireless receiver ensures a large back EMF and safe operation, but wireless receiver is no longer invisible to the wireless charger. Detuning the wireless receiver by a small fraction from the wireless charger drastically reduces the current through the wireless receiver coil, and thus the power delivered by the wireless receiver to the load. The large forward EMF generated as a consequence is dropped across the residual resistance of the tank circuit. At typical near-field operating frequencies, both the wireless receiver coil and its series capacitor are off-chip and can easily tolerate a large inducted voltage.

Figure 2A:
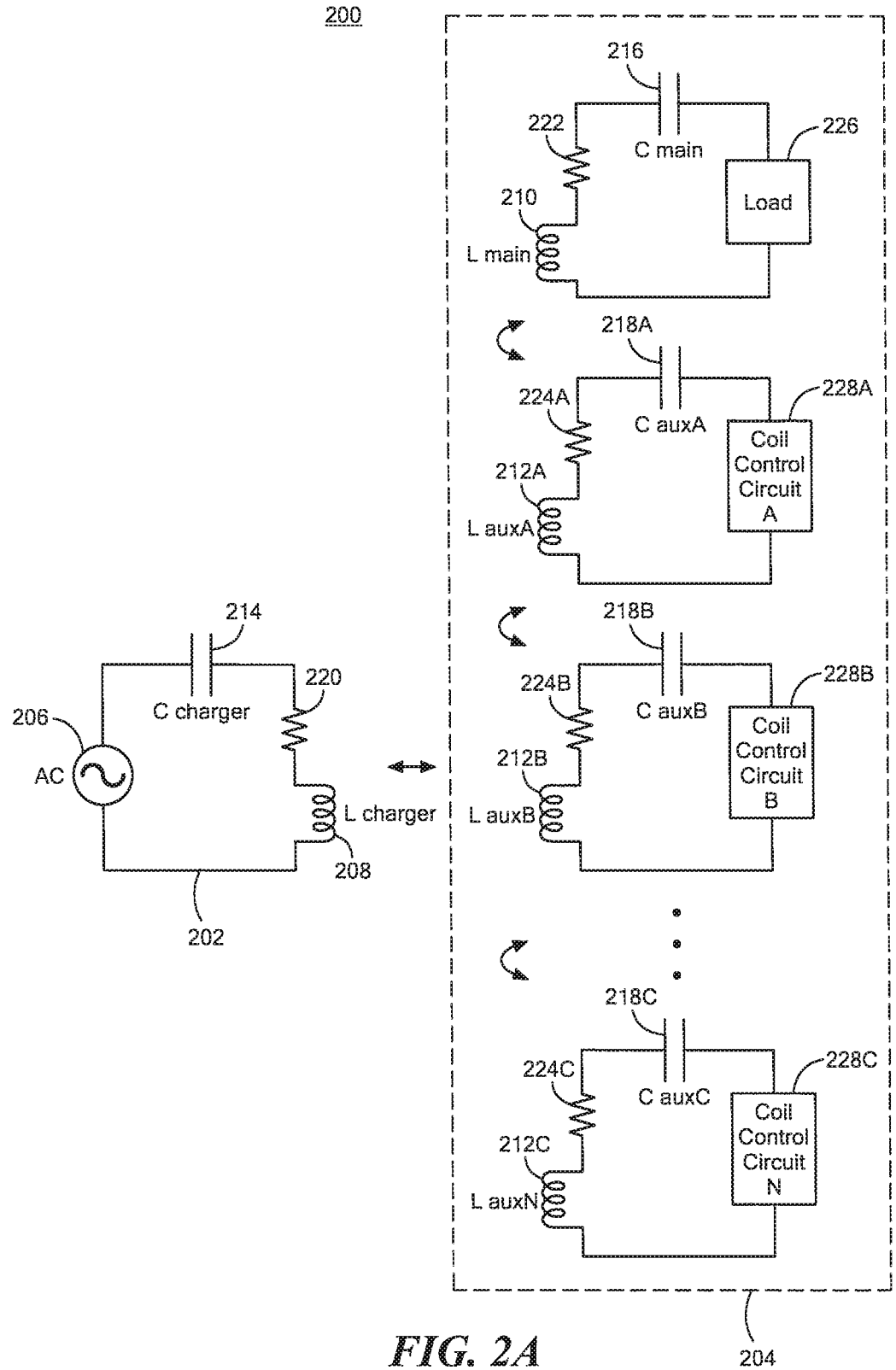
FIG. 2A is a block diagram of an illustrative embodiment of a wireless power charger and a wireless power receiver having a plurality of auxiliary elements.

Referring now to FIG. 2A, a wireless charging system 200 includes a wireless power charger 202 and a wireless power receiver 204. In some embodiments, wireless receiver may comprise more than one auxiliary tank circuit. While in the illustrative embodiment of FIG. 2A, wireless receiver includes three auxiliary tank circuits, in other embodiments a different number of auxiliary tank circuits may be used, such as, for example, from 1 to N auxiliary tank circuits.

Each auxiliary tank circuit is coupled to a respective control circuit 228 that is configured to control the effective impedance coupled to the auxiliary tank circuit.

Each auxiliary inductive element of an auxiliary tank circuit, represented in the illustrative embodiment of FIG. 2A as coils $L_{auxiliary}$ A-N 212A-N, resonates at a respective desired frequency. Because each auxiliary inductive element 212 resonates at a frequency according to its respective auxiliary tank circuit, to achieve a desired frequency for an auxiliary inductive element, the value of the auxiliary inductive element is selected in conjunction with its respective auxiliary tank circuit, specifically according to the capacitance value of its respective capacitive element $C_{auxiliary}$ 218. For example, the value for auxiliary inductive element $L_{auxiliary}$ B 212B is selected in conjunction with capacitance $C_{auxiliary}$ B 218B to achieve a desired resonant frequency for $L_{auxiliary}$ B 212B.

Further, due to the resonant nature of $L_{main}$ and $L_{auxiliary}$ A-N, coupling exists between $L_{main}$ and each auxiliary inductive element $L_{auxiliary}$ A-N. As discussed above, with reference to FIG. 2, the strength of the coupling between the $L_{main}$ and $L_{auxiliary}$ is dependent on, in part, by the resonant frequency of each inductive element, the physical size of each inductive element, their proximity with respect to each other, their orientation with respect to each other, or any combination thereof—to name a few examples. Likewise, the strength of the coupling between $L_{main}$ and each auxiliary inductive element $L_{auxiliary}$ A-N is dependent on the physical size of each inductive element, their proximity with respect to each other, their orientation with respect to each other, or any combination thereof—to name a few examples.

Further, as discussed above with reference to FIG. 2, the resonant frequency of $L_{main}$ is adjusted according to the strength of the coupling between $L_{main}$ and $L_{auxiliary}$ with the strength of the coupling between $L_{main}$ and $L_{auxiliary}$ being dependent upon an impedance presented to the auxiliary tank circuit. Likewise, the resonant frequency of $L_{main}$ is adjusted according to the strength of the coupling between $L_{main}$ and each auxiliary inductive element $L_{auxiliary}$ A-N. The strength of each coupling between $L_{main}$ and each auxiliary inductive element $L_{auxiliary}$ is dependent on a respective impedance shown to each respective auxiliary tank circuit.

Each control circuit (e.g. coil control circuit) of the wireless receiver controls the impedance presented to the respective auxiliary tank circuit to which it is coupled. As the impedance presented to a respective auxiliary tank circuit changes, so does the strength of the coupling between $L_{main}$ and the respective $L_{auxiliary}$ and thus the resonant frequency of $L_{main}$. Therefore, adjusting the impedance presented to one of the auxiliary tank circuits may alter the resonant frequency of $L_{main}$ to increase the difference between $L_{main}$ and $L_{charger}$, thus altering the strength of the coupling between $L_{main}$ and $L_{charger}$—in other words, detuning $L_{main}$ from $L_{charger}$. This is discussed in further detail below with reference to FIG. 3.

Figure 2B:
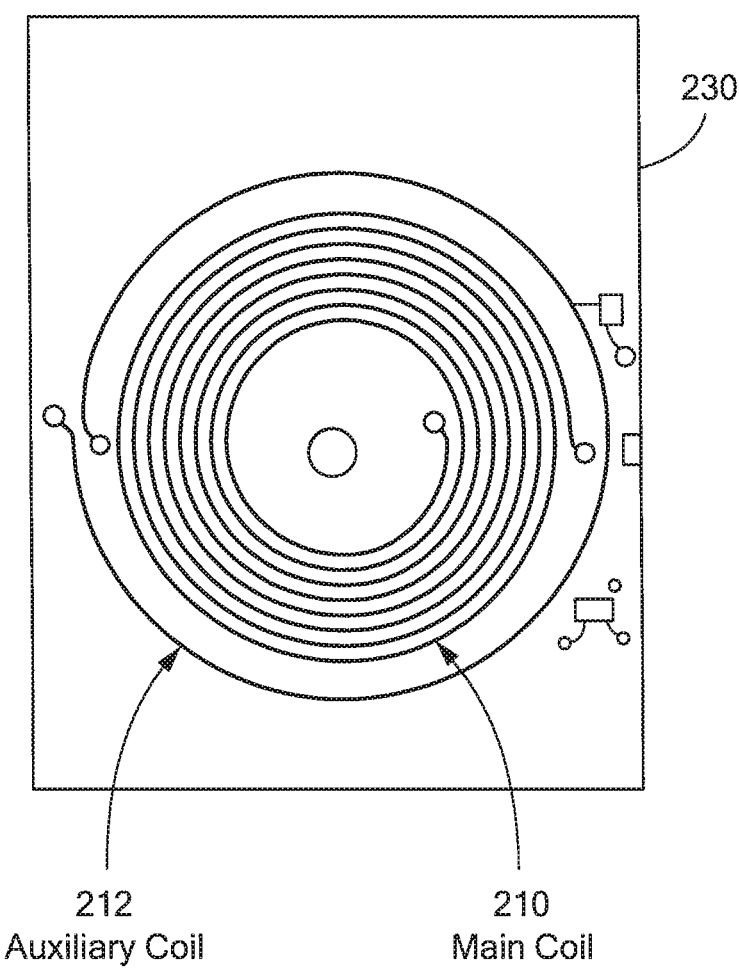
FIG. 2B is an image of a wireless power receiver which may be the same as or similar to the wireless power receiver of FIG. 2A.

FIG. 2B is a block diagram of an illustrative embodiment of a layout for wireless charging receiver. According to some embodiments, both the main tank circuit and auxiliary tank circuit of wireless receiver may be provided on the same printed circuit board ("PCB") 230. When provided on the same PCB 230, inductive elements $L_{main}$ 210 and $L_{auxiliary}$ 212 may be arranged so that element $L_{auxiliary}$ 212 surrounds $L_{main}$ 210.

Figure 3:
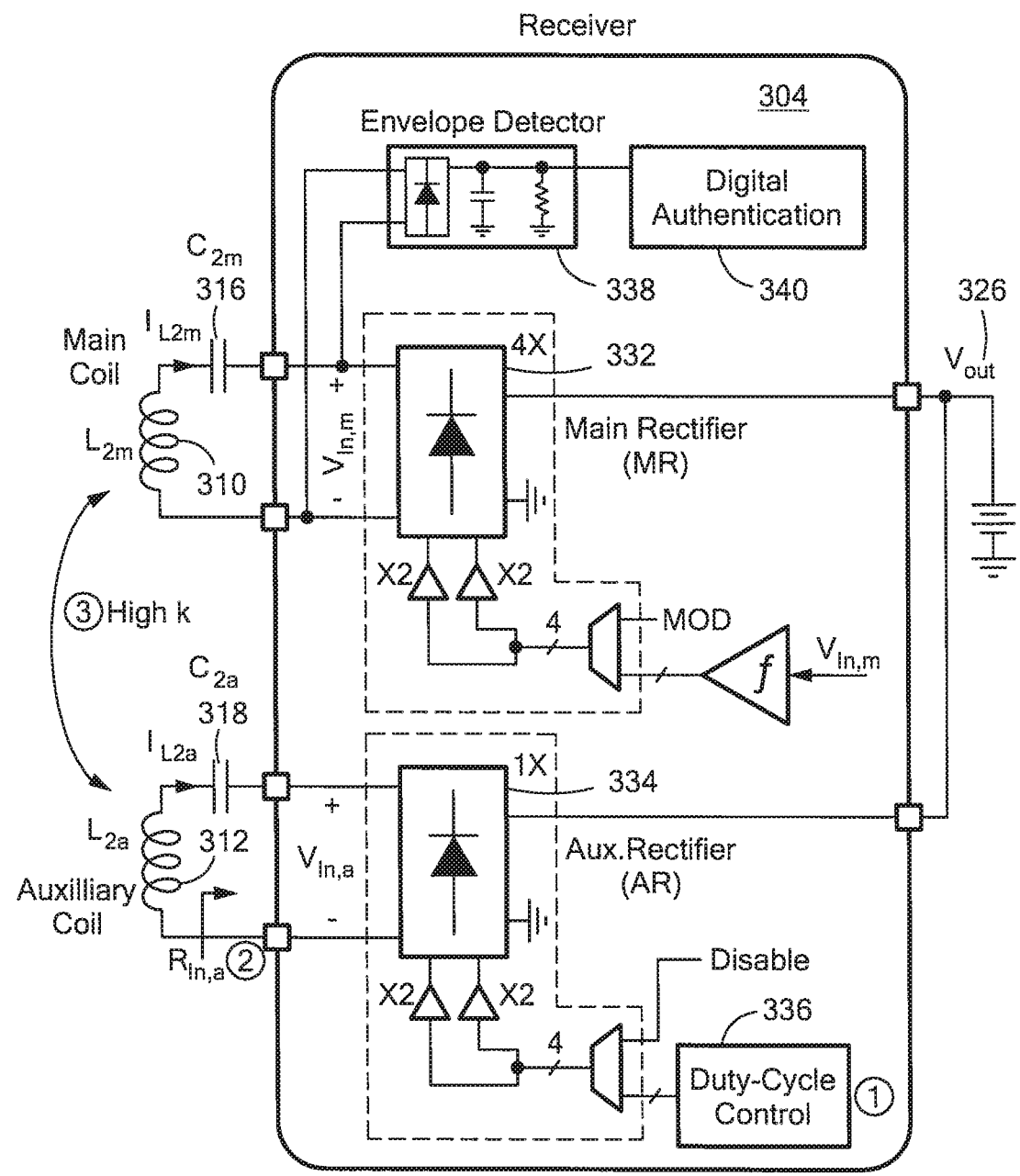
FIG. 3 is a block diagram of a wireless receiver having tank circuits and a control circuit.

Referring now to FIG. 3, a wireless receiver 304 includes tank circuits and control circuits. In the illustrative embodiment of FIG. 3, the wireless receiver comprises a main tank circuit (comprising main coil $L_{2m}$ 310 and capacitor $C_{2m}$ 316) connected or otherwise coupled to a control circuit (comprising envelope detector 338, main rectifier MR 332, and digital authentication engine 340) and an auxiliary tank circuit (comprising auxiliary coil $L_{2a}$ 312 and capacitor $C_{2a}$ 318) coupled to a control circuit (comprising auxiliary rectifier AR 334 and duty cycle control 336). The output 326 of both MR 332 and AR 334 is connected to a load.

The digital authentication engine 340 is configured to validate wireless receiver with a wireless charger. This is further discussed below, with reference to FIG. 8.

As discussed above, the movement of the poles of two second-order systems under strong coupling can be used to implement detuning. If the two coils on the receiver are coupled, the amount of receiver detuning can be controlled by controlling the value of the feedback transfer function between them.

The wireless receiver in the illustrative embodiment of FIG. 3 has two coils: a main coil 310 that receives the bulk of the power when the receiver is tuned to the charger, and an auxiliary coil 312 that detunes the system when required. The value of the feedback transfer function can be changed by manipulating the value of an impedance connected to the auxiliary coil via the coil control circuit, albeit without direct proportionality to the loop transfer function. A zero-coupling condition can be replicated by open-circuiting the auxiliary coil, which allows the main coil to receive power from a charger tuned to the $L_{2m}$-$C_{2m}$ resonant frequency. Maximizing the magnitude of the feedback transfer function by short-circuiting the auxiliary coil leads to maximal detuning.

Setting the LC resonances of the two coils at separate frequencies leads to better detuning response. The $L_{2a}$-$C_{2a}$ tank is chosen to have a lower resonant frequency than the $L_{2m}$-$C_{2m}$ tank. This has many advantages—because the charger is tuned to the $L_{2m}$-$C_{2m}$ tank when the receiver is receiving power, any harmonics generated by the power amplifier at the charger should not excite the $L_{2a}$-$C_{2a}$ tank at its resonant frequency and lead to a loss in the power transfer efficiency. The higher frequency poles move farther from the original positions than the lower frequency ones, and hence should correspond to the poles of the $L_{2m}$-$C_{2m}$ tank, which receives power in the tuned state. Finally, choosing the $L_{2a}$-$C_{2a}$ tank resonance at a higher frequency could cause issues with it being too close to the self-resonance frequency of the auxiliary coil, beyond which the auxiliary coil behaves as a capacitor.

The resonant frequency of the receiver changes in the region where the impedance connected to the auxiliary coil is comparable to the reactance of the auxiliary coil inductance. As the impedance connected to the auxiliary load increases, the resonant frequency decreases. Under the limit where the impedance connected to the auxiliary coil approaches infinity, the effect of the auxiliary coil begins to disappear and the receiver's resonant frequency approaches:

$$(2\pi\sqrt{L_{2m}C_{2m}})^{-1} \qquad [EQ5]$$

which is the natural oscillation frequency of the main coil $L_{2m}$-$C_{2m}$ tank.

The rectifier connected to the main coil rectifies the AC induced voltage and delivers energy to an external voltage source, which may be, as an example, a battery coupled in parallel with a filter capacitor with low equivalent series resistance ("ESR"). The control circuit comprises an auxiliary rectifier connected to the auxiliary coil and acts as an impedance presented to the auxiliary coil. The auxiliary rectifier has the same external DC voltage source at its output.

In embodiments, the rectifier is a synchronously driven full-bridge rectifier provided from of low-side NMOS and high-side PMOS devices. The gate drivers driving the MOS switches have an in-built, statically configured dead time to prevent a short circuit path forming from the output to ground.

The main coil resonance frequency may be represented as:

$$(2\pi\sqrt{L_{2m}C_{2m}})^{-1} \qquad [EQ6]$$

Also known as the frequency at which the charger transmits power, may be set to, in an example embodiment, 6.78 MHz ($f_{op}$). The auxiliary coil resonance frequency is represented as:

$$(2\pi\sqrt{L_{2a}C_{2a}})^{-1} \qquad [EQ5]$$

The auxiliary coil resonance frequency may be set at, as an example, $f_{op}/2$. When the receiver is configured to accept power, the main rectifier delivers energy to the DC output. In this mode, the impedance coupled to auxiliary rectifier is made large by disabling its switch gate drive. The main rectifier is controlled by a synchronous gate driver that uses comparators to detect the turning on of the body diodes in order to turn the FETs on.

An envelope detector made up of a passive, diode-based rectifier followed by an RC low-pass filter demodulates the forward telemetry messages, which appear as an On-Off Keying (OOK)-modulated current waveform induced by the charger. For backward telemetry, the receiver uses load-shift keying on the main coil, i.e. shorting the main coil or connecting it to the load in order to signal bits. The short circuit functionality is implemented by using the two low-side switches on the main rectifier instead of adding a separate switch in parallel to the rectifier. This reduces the parasitic capacitance across AC input of the main rectifier by up to 30%.

Figure 4:
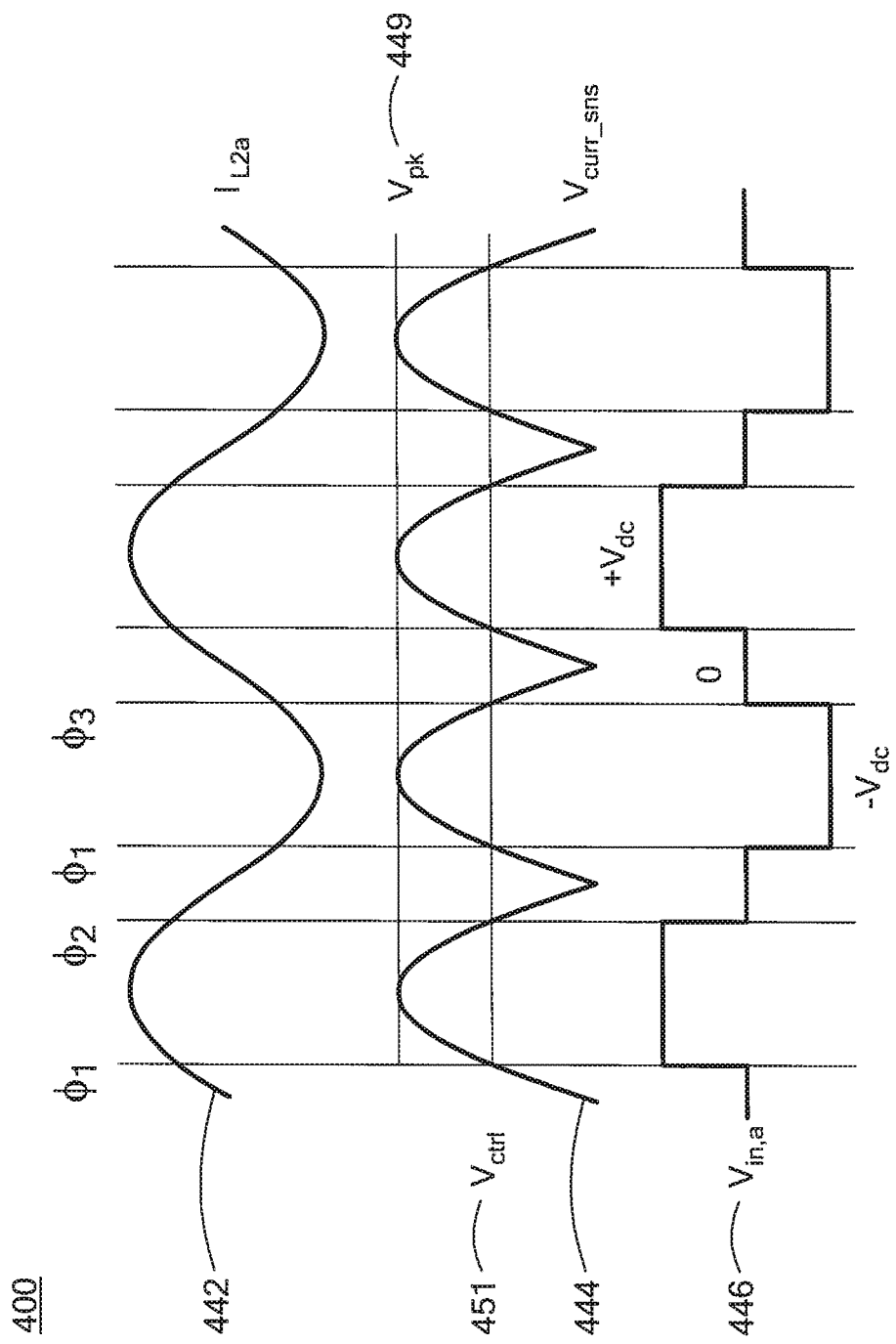
FIG. 4 is a plot of voltage and current vs. time representing a current sense-based rectifier control.

Coil control circuit further includes duty cycle control. Duty cycle control is configured to set a duty cycle to control the AC input resistance of the auxiliary rectifier. The AC input resistance acts as the impedance connected to the auxiliary coil, and thus controls detuning of $L_{main}$. The set duty cycle is determined using a current sense-based approach as depicted in FIG. 4. The voltage $V_{curr\_sns}$ 444 is obtained by sensing the currents in the active low-side switch using a smaller replica biased transistor whose current is passed through an on-chip resistor.

FIG. 4 is a plot 400 illustrating current sense-based rectifier control. A peak detector circuit retrieves the local peak voltage of $V_{curr\_sns}$ 444, which is shown as $V_{pk}$ 449 in FIG. 4. The duty cycle of the rectifier is set by a DC control voltage $V_{ctrl}$ 451 which is obtained from the peak voltage $V_{pk}$ 449 using a digital-to-analog converter (DAC)-based resistor divider. When current sensor voltage $V_{curr\_sns}$ 444 is less than the DC control voltage $V_{ctrl}$ 451 (i.e. $V_{curr\_sns} < V_{ctrl}$), the auxiliary coil is shorted by turning both the low-side switches on and both the high-side switches off. When current sensor voltage $V_{curr\_sns}$ 444 is greater than the DC control voltage $V_{ctrl}$ 451 (i.e. $V_{curr\_sns} > V_{ctrl}$), the appropriate low- and high-side switches are turned on based on the sign of a current $I_{L2a}$ 442 to deliver power to the output. By changing the settings of the resistor DAC, the value of the DC control voltage $V_{ctrl}$ relative to the local peak voltage of $V_{curr\_sns}$ 444 designated as $V_{pk}$ 449 can be changed. This controls the fraction of the cycle for which the rectifier delivers power to the load. The switch configurations for two of the three phases of the rectifier in FIG. 4 are shown in FIGS. 5 and 5A.

Figure 5:
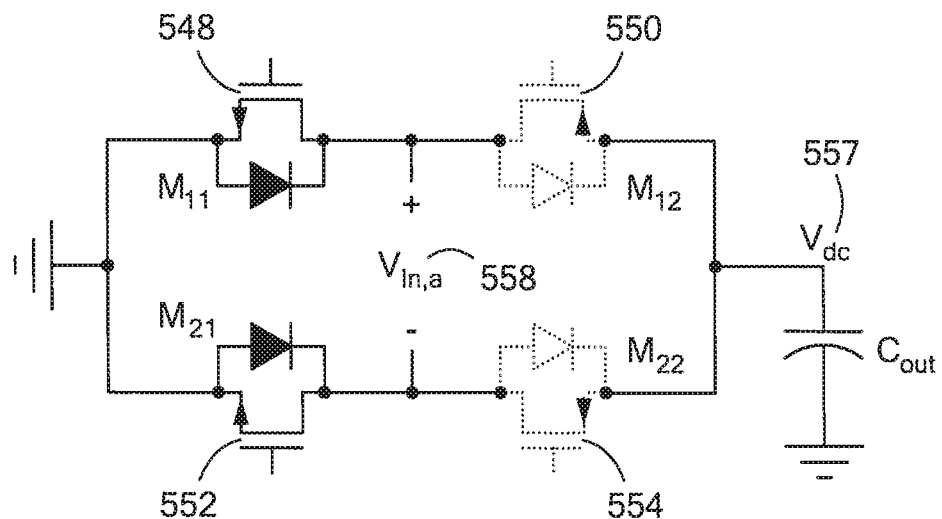
FIGS. 5 and 5A are schematic circuit diagrams of rectifiers of a wireless receiver.
Figure 5A:
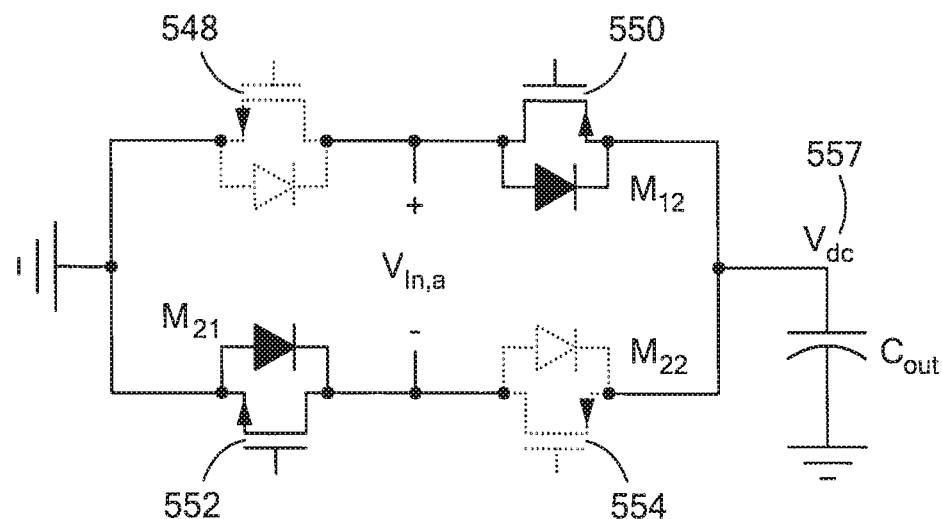

FIGS. 5 and 5A illustrate a circuit diagram of the rectifiers 500 of the wireless receiver. The reflections may, for example, comprise a plurality of MOSFETs 548-554. The output 557 of the auxiliary rectifier can be considered as a DC voltage. Hence, across its AC input terminals, the auxiliary rectifier can be modeled with an AC voltage source in phase with its input current and a series resistor that models the on resistance of its switches. Even though the rectifier cannot be modeled solely as a load resistor of fixed value, the two-coil receiver system still has two complex conjugate open loop pole pairs. The duty cycle of the auxiliary rectifier, δ, can be defined as the fraction of the total oscillation period during which the auxiliary rectifier is connected to its output. The control voltage is related to the duty cycle as $V_{ctrl}=V_{peak}\cos(\pi\delta/2)$. The first harmonic of the input voltage of the auxiliary rectifier, $V_{in,a}$ 446, is proportional to $\sin(\pi\delta/2)$. Modulating $V_{in,a}$ 446 (and hence the effective input resistance of the rectifier) controls the auxiliary coil current ($I_{L2a}$) relative to the main coil current Um, causing the system poles to move away from $f_{op}$.

Figure 6:
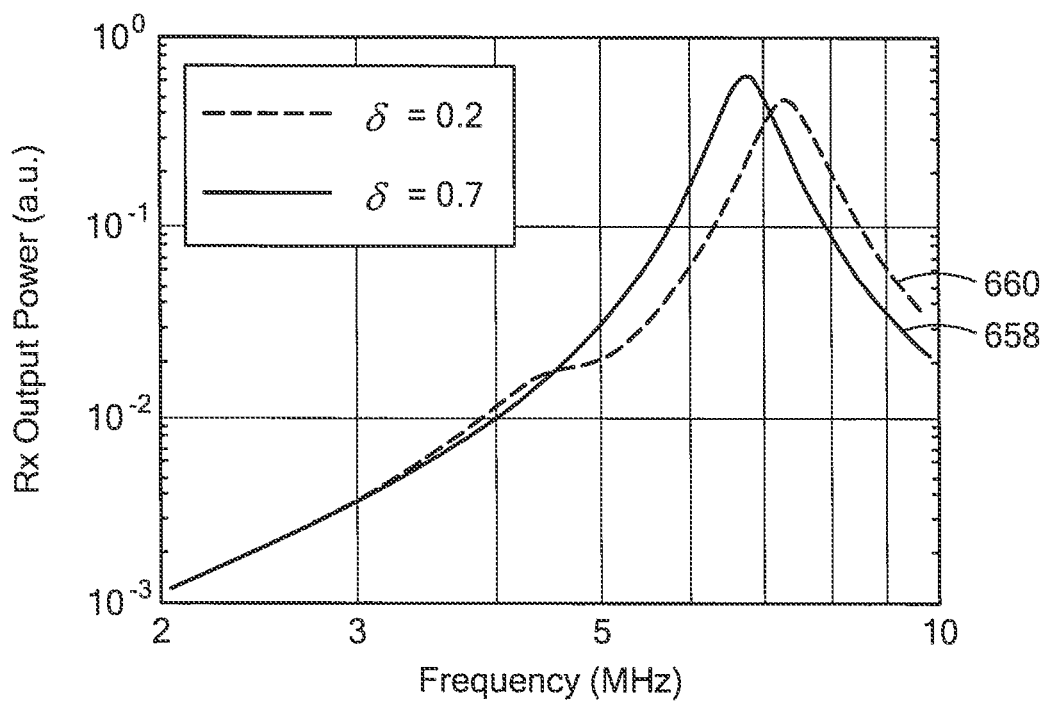
FIG. 6 is a plot of receiver output power vs. frequency, representing the extent of detuning achieved by the use of one or more auxiliary elements within a receiver of a resonant wireless charging system.
Figure 6A:
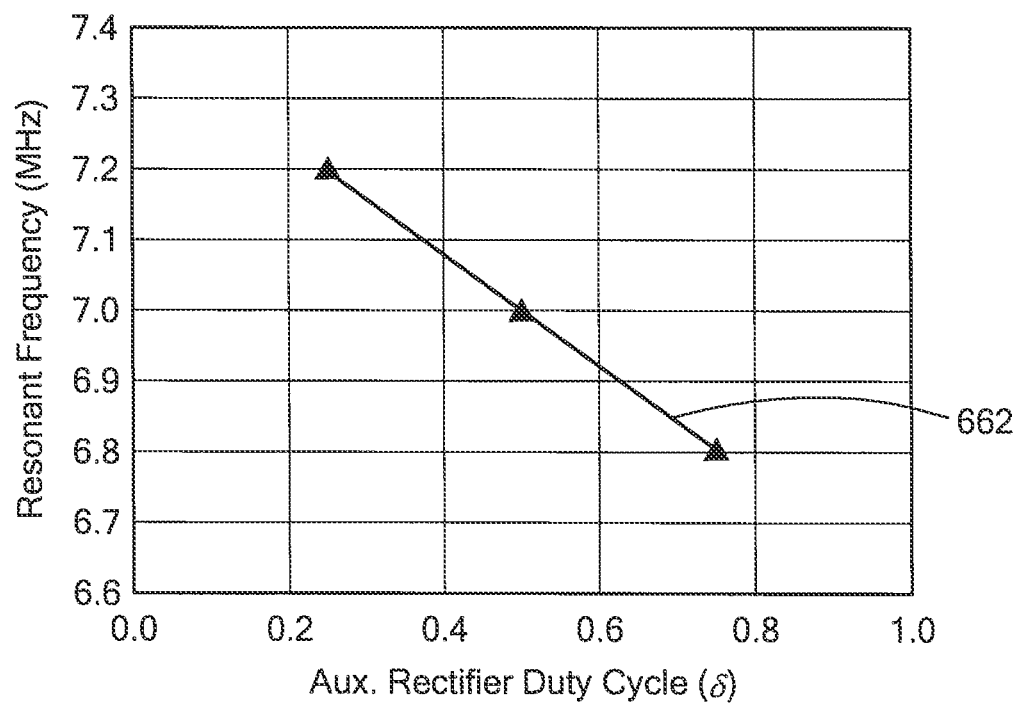
FIG. 6A is a plot of the resonant frequency of the wireless receiver vs the duty cycle of the auxiliary rectifier.

FIG. 6 is a plot, representing the extent of detuning $L_{main}$ within the wireless system at two duty cycles 658 and 660, and FIG. 6A is a plot 662 of the resonant frequency of the wireless receiver vs the duty cycle of the auxiliary rectifier. As the duty cycle, and hence the input resistance, of the auxiliary rectifier is reduced, the receiver begins to detune. This causes both $I_{L2m}$ and the induced back-EMF on the charging coil to decrease. Lowering the input resistance of the auxiliary rectifier, (i.e. the impedance presented to the auxiliary inductive element) leading to a higher resonant frequency at the receiver.

Appropriate sizing of the auxiliary coil is necessary to ensure good detuning performance as well as high efficiency and output power in tuned operation. If the auxiliary coil inductance $L_{2a}$ is made large by having a large area or a large number of turns on it, the mutual inductance from the charging coil to the auxiliary coil increases, and so does the induced voltage from the charger. In this case, when the receiver is configured to receive power from the charger, the large induced voltage on the auxiliary coil can inadvertently turn on the passive rectifier formed by its body diodes even when the gate drive is turned off. This could lead to detuning when it is not desired and lower the overall received power and power transfer efficiency. On the other hand, making $L_{2a}$ small reduces the feedback loop gain and the amount of detuning achievable when the receiver is configured to block the charger.

Figure 7:
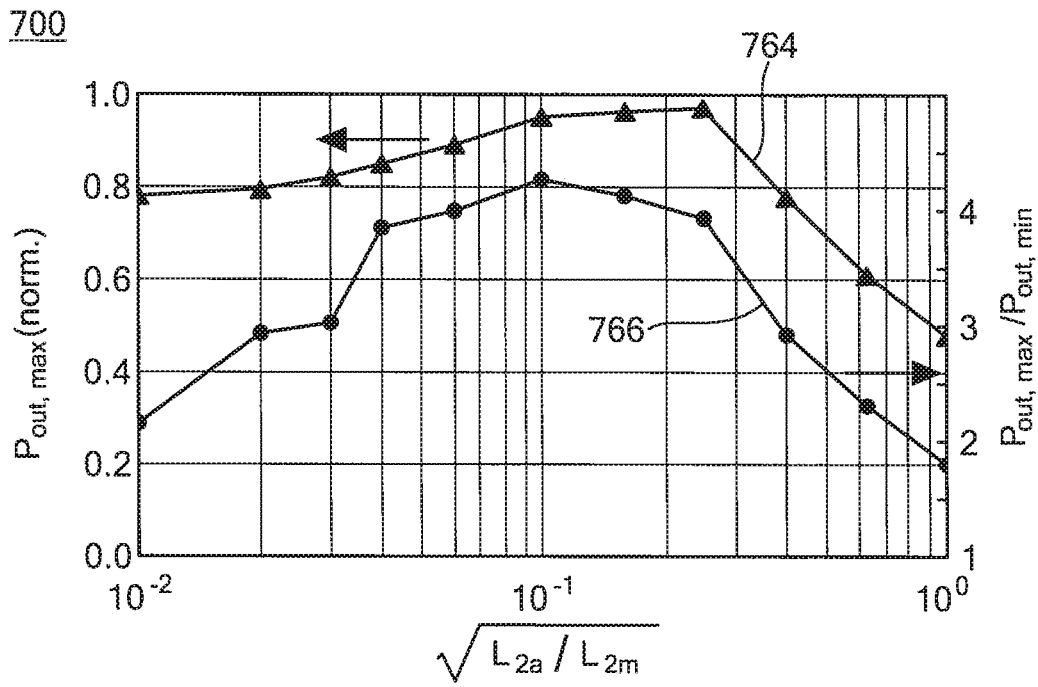
FIG. 7 is a plot of receiver output vs the ratio of the inductive values of the main inductive element to the auxiliary inductive element.

FIG. 7 is a plot 700 of receiver output vs the inductive turns ratio between the main inductive element to the auxiliary inductive element. If the effective turns ratio between the main coil and the auxiliary coil on the receiver, $N_{rx}=\sqrt{(L_{2a}/L_{2m})}$, is large, the maximum output power 764 and 766 goes down since the receiver is fairly detuned even with the auxiliary rectifier gate drive disabled. When the turns ratio is small, the power blocking capability goes down when the auxiliary rectifier is enabled. The power blocking capability is measured as the ratio of the output power when the auxiliary rectifier is fully disabled to the output power when the auxiliary rectifier is fully shorted. A turns ratio may comprise, for example, $N_{rx}=0.28$ to achieve reasonable detuning while preventing inadvertent detuning during resonant power transfer. Since the auxiliary coil is smaller than the main coil, it has a smaller induced voltage from the charger coil. The currents in the auxiliary coil are also smaller since it is tuned at $f_{op}/2$. Hence, the switches on the main and the auxiliary rectifiers can be scaled, as an example, in a 4:1 size ratio to reflect this.

In some embodiments, the coils are implemented in a concentric fashion for better coupling. The addition of the auxiliary coil leads to a larger total coil area on the receiver, which corresponds to a larger area penalty over having just a main coil. The auxiliary coil also requires an additional ceramic capacitor on the PCB, whose footprint is negligible to the total coil area. In other embodiments, non-concentric configurations may be used.

Figure 8:
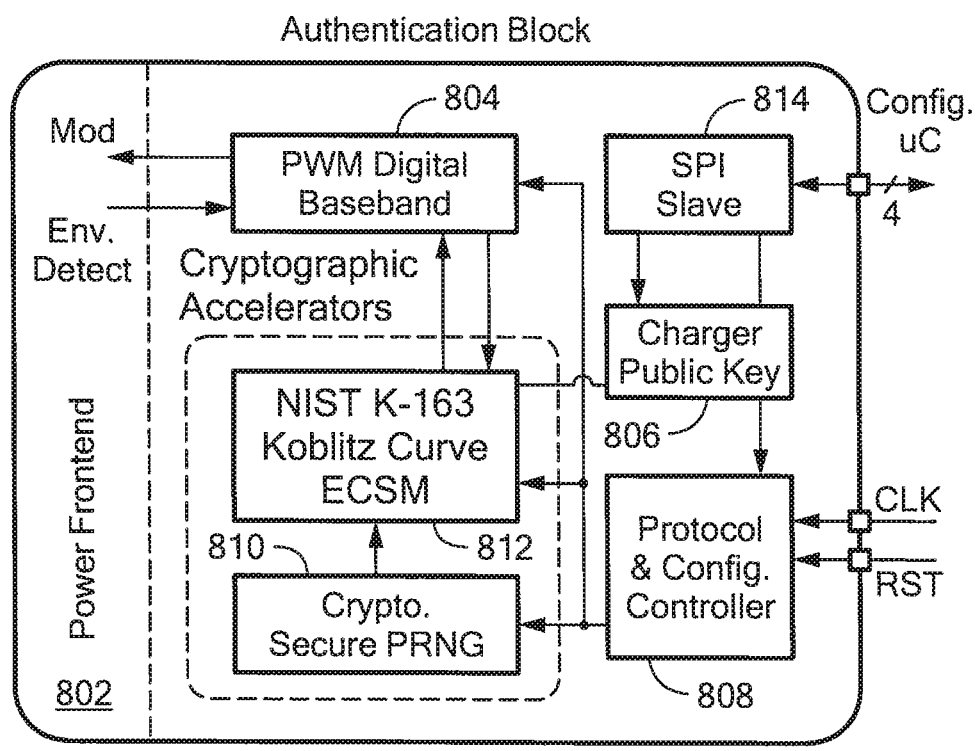
FIG. 8 is a block diagram of an authentication engine for a wireless receiver.

FIG. 8 illustrates a block diagram of an authentication engine 802 for a wireless receiver. In some embodiments authentication engine 802 may comprise digital circuits (such as digital logic circuits, modulators, drivers, or any combination thereof, to name a few examples), analog components (such as for example analog logic circuits, modulators, drivers, or any combination thereof, to name a few examples), or any combination thereof.

Wireless receiver includes an authentication engine configured to determine whether to accept or block wireless power transfer from a wireless charger based upon the result of a challenge-response authentication protocol executed with the wireless charger. According to some embodiments, the authentication engine includes a baseband pulse-width modulation ("PWM") modem 804 for communication with a wireless charger, an serial peripheral interface core 814 ("SPI") controller for initial configuration, and two-cryptographic accelerators: a first cryptographic accelerator 810 (such as, e.g., a pseudorandom number generation ("PRNG")) configured to generate random challenges and a second cryptographic accelerator 812 (such as, e.g. an Elliptic Curve Scalar Multiplier ("ECSM")) that is configured to verify responses received from the wireless charger 806, and controller (e.g. a microcontroller) 808. According to some embodiments, each time the first cryptographic accelerator is initialized, a new initial state, or "seed", to ensure that no repeated challenges are generated by the first cryptographic accelerator. In some embodiments, the first cryptographic accelerator includes a true random number generator configured to generate random challenges to ensure that no repeated challenged are generated by the first cryptographic accelerator The wireless receiver is configured to communicate with a wireless charger over the coupling, or inductive link, between the main inductive element of the wireless receiver and the inductive element of the wireless charger. Data, or packets, received and transmitted over the inductive link comprise PWM baseband waveforms. The use of PWM baseband waveforms makes clock recovery unnecessary and simplifies demodulation at both ends. Further, packets received by the wireless receiver from the wireless charger over the inductive link are modulated—such as, for example, using On/Off Key ("OOK") modulation—and packets sent over the inductive link from the wireless receiver to a wireless charger receiver are keyed—such as, for example, using load-shift keying.

Wireless charger includes a storage that stores plurality of private keys. The storage comprises a flash memory, a programmable memory, a read-only memory, a processor, a microprocessor, or any combination thereof, to name a few examples. The private keys stored on wireless charger are used to authenticate challenges received from wireless receiver. According to some embodiments, the private keys stored on wireless charger are unique to each wireless charger, in other words each wireless charger has a distinct set of private keys.

Wireless receiver includes a storage that stores a plurality of public keys. The storage comprises a flash memory, a programmable memory, a read-only memory, a processor, a microprocessor, or any combination thereof, to name a few examples. The public keys stored on the wireless receiver are used in the generation of a challenge by the wireless receiver. According to some embodiments, one or more wireless receivers may store identical sets of public keys.

According to some embodiments, the challenge-response protocol employs a Diffie-Hellman based scheme, where the receiver generates a random scalar c and sends the point represented as:

$$C=c_G \qquad [\text{EQ08}]$$

where G represents the generator of the curve, as the challenge.

The wireless charger then uses a private key stored on wireless charger, p to compute a response represented as $$R=pC \qquad [\text{EQ09}]$$

The wireless receiver then uses the charger's public key, represented as $$P=pG \qquad [\text{EQ10}]$$

to check whether R=c P. Thus, the wireless receiver needs to perform two scalar multiplications in order to authenticate the charger: first to generate the challenge and then to verify the response. Because scalar multiplications are a relatively costly operation, the second cryptographic accelerator, such as, for example an ECSM, is used to accelerate them.

FIGS. 9 and 9A-C are a series of block diagrams of a second cryptographic accelerator 902 of an authentication engine, represented here as an ECSM. As discussed above, the second cryptographic accelerator 902 may include, for example, an ECSM. ECSM implements scalar multiplication on a curve, such as, for example a National Institute of Standard and Technology ("NIST") curve, a Koblitz curve, or any combination thereof. The curve is specified over a field, such as, for example, a binary field and provides a security level. Koblitz curves allow for efficient scalar multiplication by using the Frobenius endomorphism ($\tau$). Scalar multiplication is commonly computed using a double and add ladder, but on Koblitz curves the scalar may be recoded to its Advanced Digital Information Cooperation (ADIC) representation and allow for the replacement of the doubling by more efficient $\tau(P)=\tau(x,y)=(x^2; y^2)$ operations.

FIGS. 9 and 9A-C present a normal representation for the field, as this makes raising to a power of 2 i.e.$x^{2n}$ a left shift by n-bits 908-918, 922, thus making the operation essentially free. This is the main source of the efficiency of Koblitz curves, making it very popular for low resource implementations. The Koblitz curves further allow the system to interpret the output of the first cryptographic accelerator, represented here as a PRNG, as the recoded scalar comprising bit 906 and controller (e.g. a microprocessor) 904 and thus avoid the need for a separate converter.

The formulae for point addition on the curve are closely coupled with the chosen point representation. If the field inversions and multiplication are represented by I and M respectively, then the affine formulae require 2M and 1/while the projective Lopez-Dahab (LD) co-ordinates require 8M for mixed point addition. According to some embodiments, the second cryptographic accelerator may use Itoh-Tsuji (IT) inversion and perform an inversion using 9M. Thus, the LD co-ordinates offer lower complexity when compared with the affine (8M vs. 11M) at the cost of increased storage of 1 extra field element. Field multiplication in the normal basis is typically more complicated than the one in the polynomial basis and from the point of compact implementation, therefore second cryptographic accelerator includes the bit-level serial input parallel output (SIPO) and parallel input parallel output (PIPO) multipliers 920.

Figure 9:
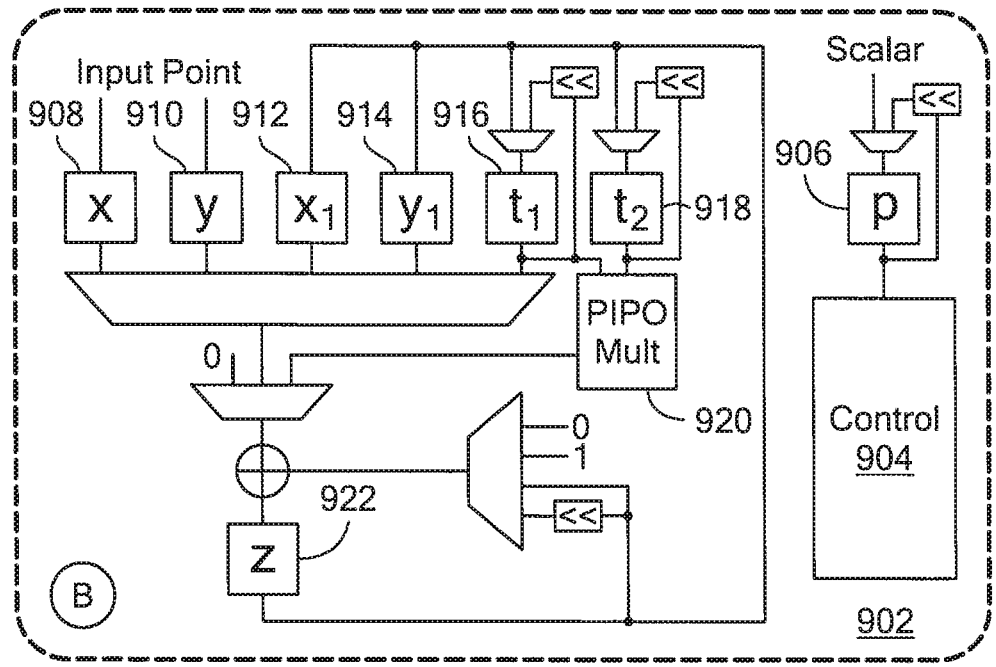
FIGS. 9, 9A-C are block diagrams of a second cryptographic accelerator of an authentication engine.
Figure 9A:
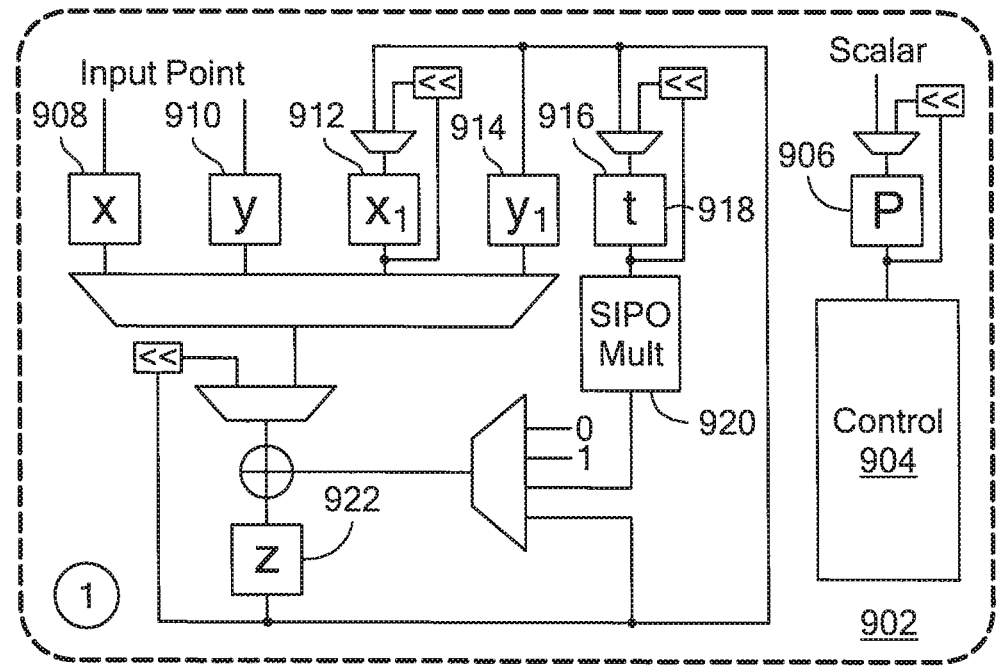
Figure 9B:
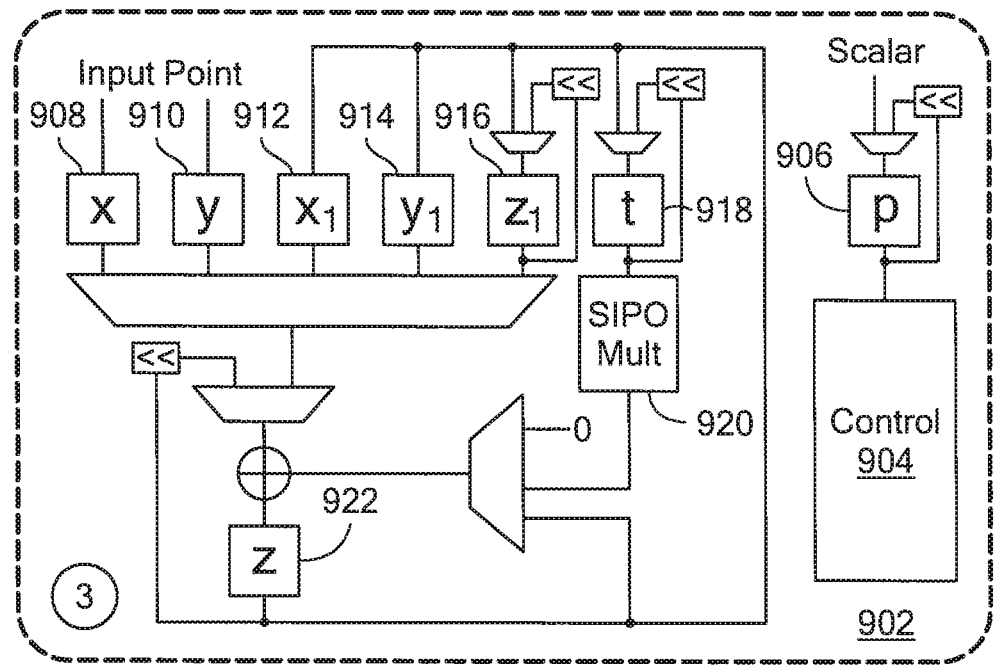
Figure 9C:
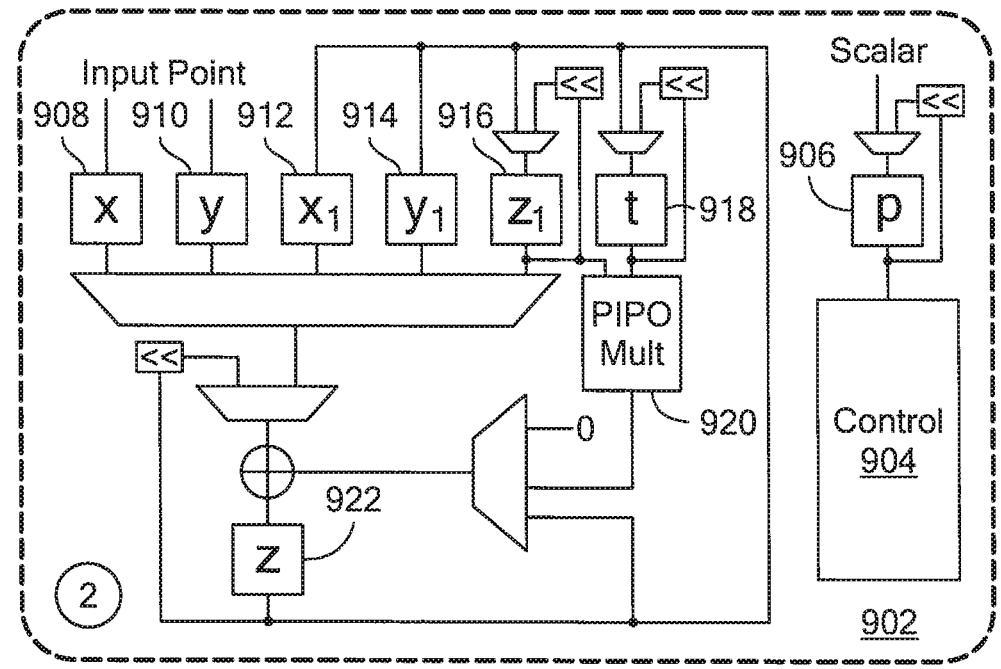

For example, the illustrated embodiments of FIGS. 9 and 9B present an embodiment where SIPO ECSM and LD coordinate ECSMs are used with SIPO multipliers, the illustrative embodiments of 9A and 9C present an embodiment where SIPO ECSM and LD coordinates are used with PIPO multipliers.

In all designs, the input point P is stored in x and y and is never disturbed. The input scalar is stored in p and the output point is retrieved from x1 912 and y1 914. Second cryptographic accelerator 902 performs left-to-right double and-add and stores the intermediate points in x1 and y1. z1 is used in LD co-ordinates for the third coordinate of the intermediate points. The field addition of any two registers is performed over two cycles: first write to z 922 by XORing with 0 and then XOR z with the second argument. The inputs to the multiplier are always fixed to avoid any mux overhead. Second cryptographic accelerator 902 copies one argument to t and then we can multiply it with either x1 or z1 while accumulating the result in z in a serial fashion.

An analysis of both the Affine and LD formulae shows that second cryptographic accelerator can implement the necessary field operations using a single accumulator z 922. The affine design strategically stores the intermediate results in t itself in order to reduce the register count. IT inversion additionally requires the multiplication oft 916 by shifted versions of itself. This would require an additional register or a barrel shifter. To resolve this issue, second cryptographic accelerator includes a SIPO multiplier. Hence, only need a 1-bit wide multiplexer that taps the appropriate bits from t instead of a full barrel shifter. This also reduces the multiplexer complexity compared to the baseline design. When using LD co-ordinates only a single final inversion of z1 is needed. Second cryptographic accelerator copies z1 to t 916 and use z1 for the shifted versions, thus avoiding an additional register for both the PIPO and SIPO multipliers.

Figure 10:
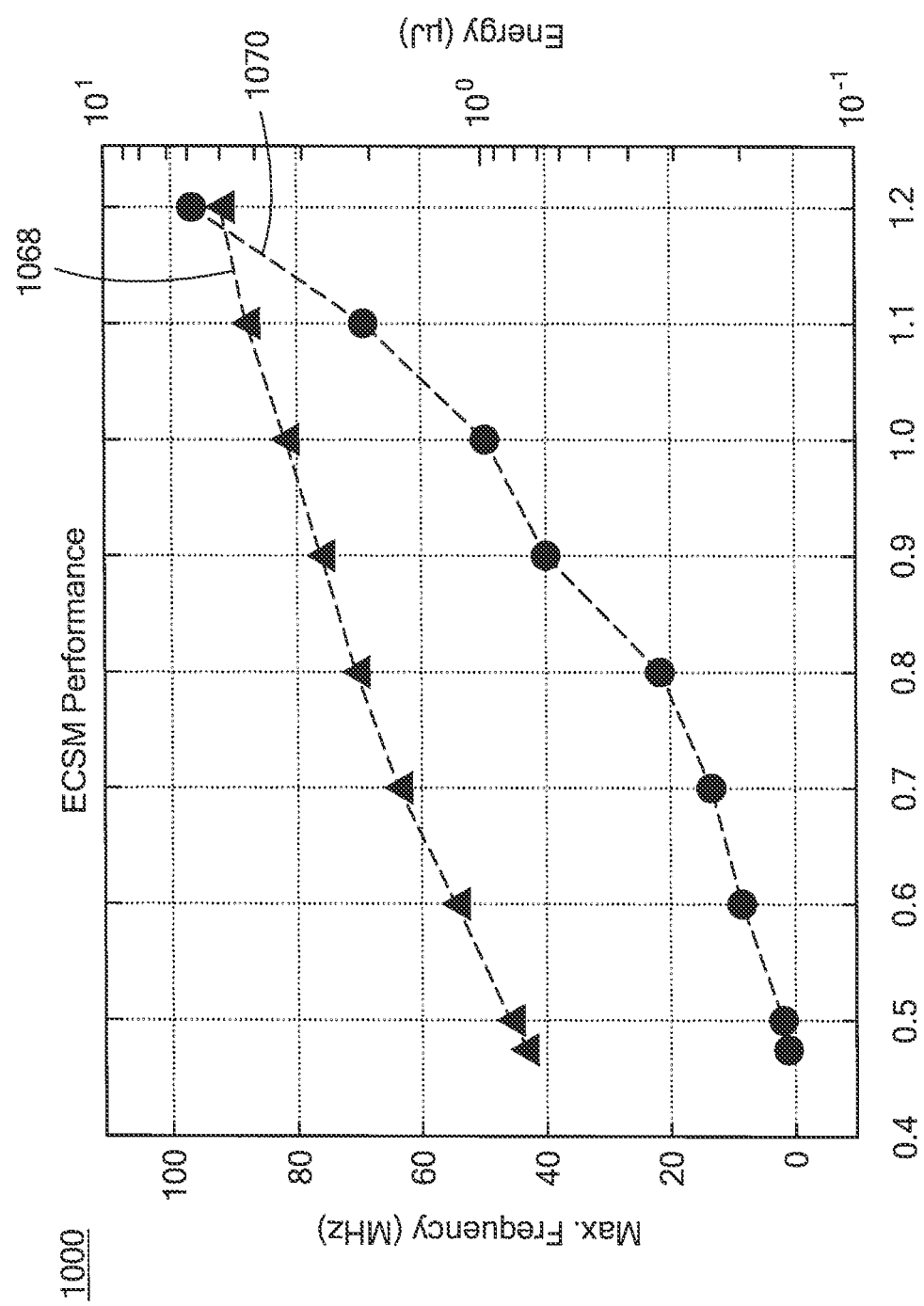
FIG. 10 is a plot representing improved ECSM energy efficiency performance obtained by operating the cryptographic accelerator at low voltage whole maintaining real time operation.

FIG. 10 is a plot 1000 representing improved ECSM energy efficiency performance obtained by operating a second cryptographic accelerator at low voltage while maintaining real world operation. FIG. 10 illustrates that the LD formulae (using 8M) 1068 when compared with the Affine (11M) 1070 formulae result in better latency and gate-efficiency for the LD implementations. However, surprisingly this does not translate to better energy-efficiency due to the larger mux overhead and higher load seen by z. The SIPO multiplier is larger than the PIPO multiplier and hence the LD SIPO implementation is worse on all metrics when compared with the LD PIPO implementation. For the affine implementations FIG. 10 illustrates that although the SIPO multiplier is larger the reduction in the register count and mux complexity results in the overall smallest implementation with roughly 27% lower energy when compared with the baseline implementation.

Figure 11:
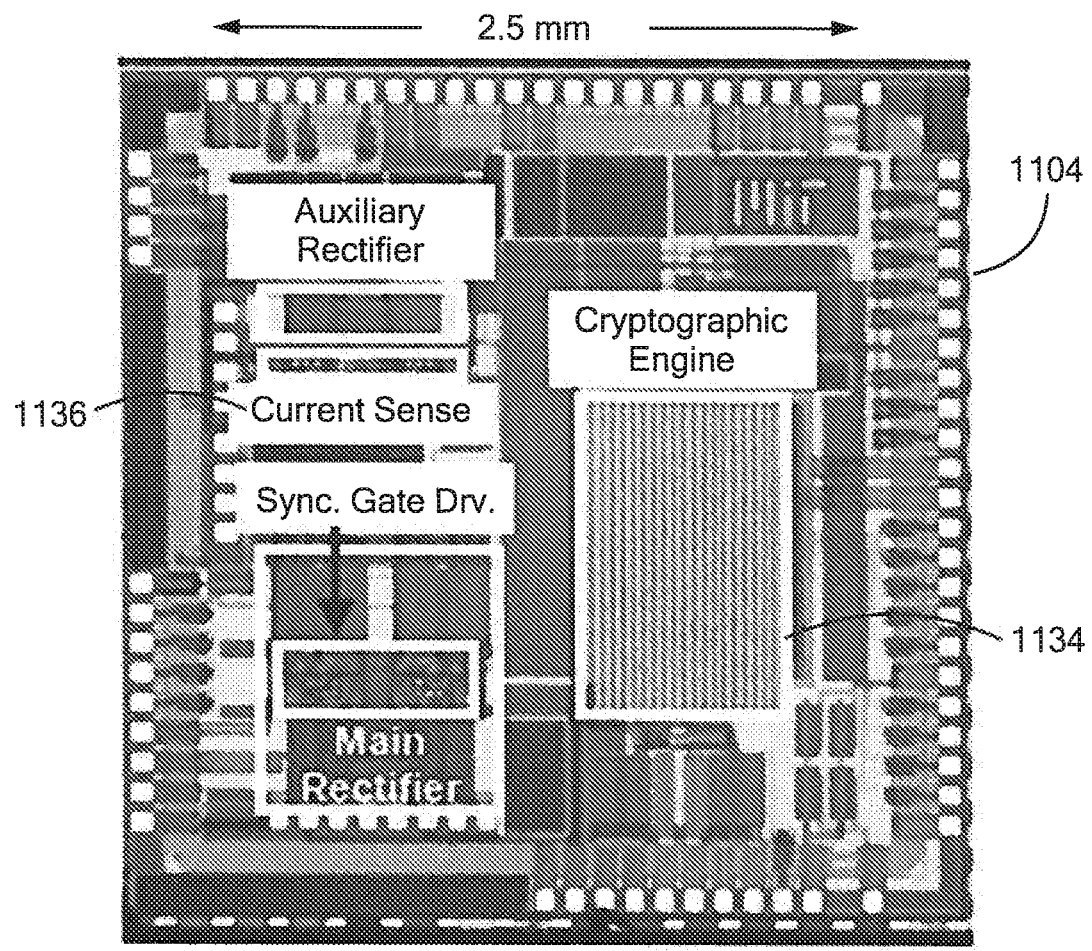
FIG. 11 is an image of an integrated circuit (IC) of a wireless receiver that includes an authentication engine.

FIG. 11 is an example image of an integrated circuit (IC) 1104 including wireless receiver that comprises an authentication engine 1134, which may be the same as or similar to the authentication engine of FIG. 8, according an exemplary embodiment. In the exemplary embodiment, the receiver was fabricated in a 0.18 μm CMOS process 1134 with 5V transistors and occupies 2.8 mm$_2$ active area. The addition of the auxiliary rectifier and its associated control circuits 1136 and 1134 increases the active area of the IC by approximately 35%. The charger was implemented using an H-bridge push-pull power amplifier made up of off-the-shelf components integrated on a PCB and driven at $f_{op}$ (6.78

MHz). The charger coil is an 8-turn, 3-in. 2-in. rectangular spiral made of PCB traces with 4.3 pH measured inductance. The power amplifier drives a series LC tank comprising the transmit coil and its series capacitor tuned at $f_{op}$. The digital baseband functionality on the charger that generates responses to the challenges sent by the receivers is implemented on a field programmable gate array ("FPGA").

Further, in the exemplary embodiment the peak DC output power in the tuned mode is 520 mW and the peak end-to-end efficiency (Pout; dc=Pin; dc) is 74%. The control circuits on the receiver consume 32 mW of power. This is with the charger operating from a 4-V supply and the receiver delivering power to a 4-V dc voltage source (both consistent with cell voltages of a standard Li-ion battery). The charger and receiver are aligned center-to-center with a vertical distance of 0.5 in. between them.

Figure 12:
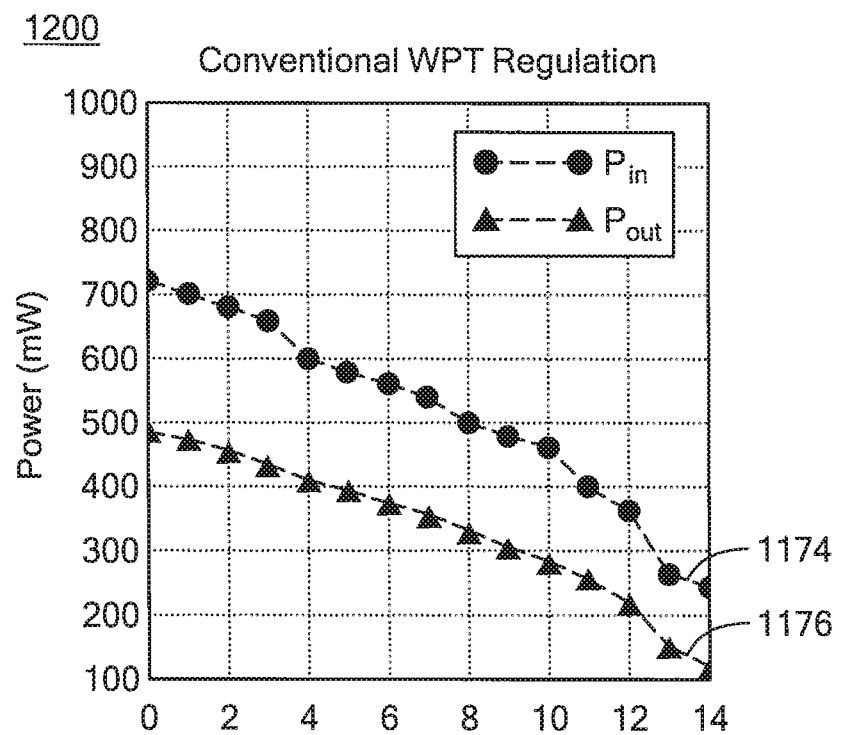
FIG. 12 is a plot representing power input and output at a wireless receiver vs tuning input during conventional WPT regulation.
Figure 12A:
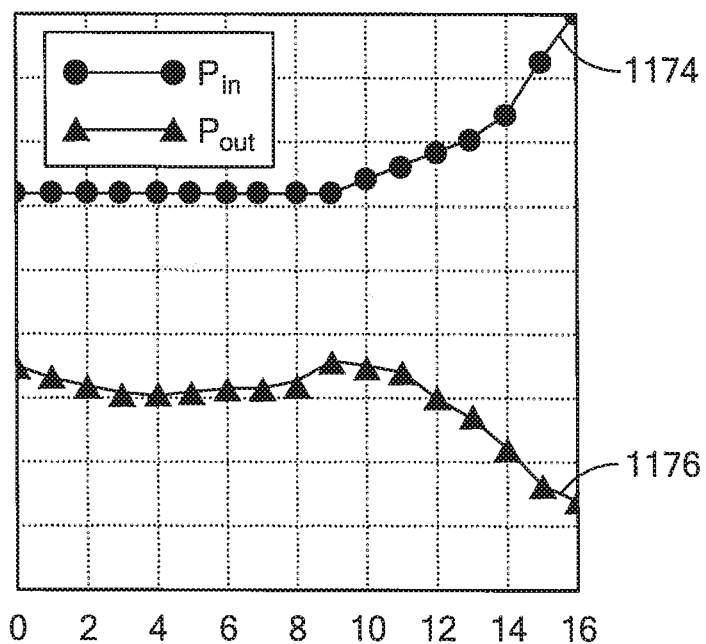
FIG. 12A is a plot on that represents the effect of regulation with controlling the auxiliary rectifier tuning input as power input and output at a wireless receiver vs. tuning input.

FIG. 12 is a plot 1200 representing power input 1174 and output 1176 at a wireless receiver vs tuning input during conventional WPT regulation. FIG. 12A shows conventional WPT regulation with a current-sense-based duty cycle control on the main rectifier, with the auxiliary rectifier disabled (i.e. the impedance seen by the auxiliary induct element is effectively zero). A larger tuning input to the digital-to-analog converter ("DAC") leads to a larger control voltage relative to the peak. This leads to a lower duty cycle and lower input resistance. As the main rectifier tuning input is increased, the main coil current goes up and so does the back-EMF. This leads to the charger drawing lower input dc power. Thus, the receiver is more visible at the transmitter and is susceptible to transients imposed by it.

FIG. 12A is a plot 1202 that represents the effect of regulation with controlling the auxiliary rectifier tuning input as power input 1174 and output 1176 at a wireless receiver vs. tuning input. As the tuning input is increased, the auxiliary rectifier input resistance $R_{in;\ a}$ decreases and the auxiliary coil current increases. As the receiver detunes due to this effect, the main coil current is expected to go down, reducing the DC output power of the receiver. In this case, detuning is evident from an increase in the charger input dc power ($P_{in;\ dc}$) due to the lower back-EMF from the lower main coil current.

Figure 13:
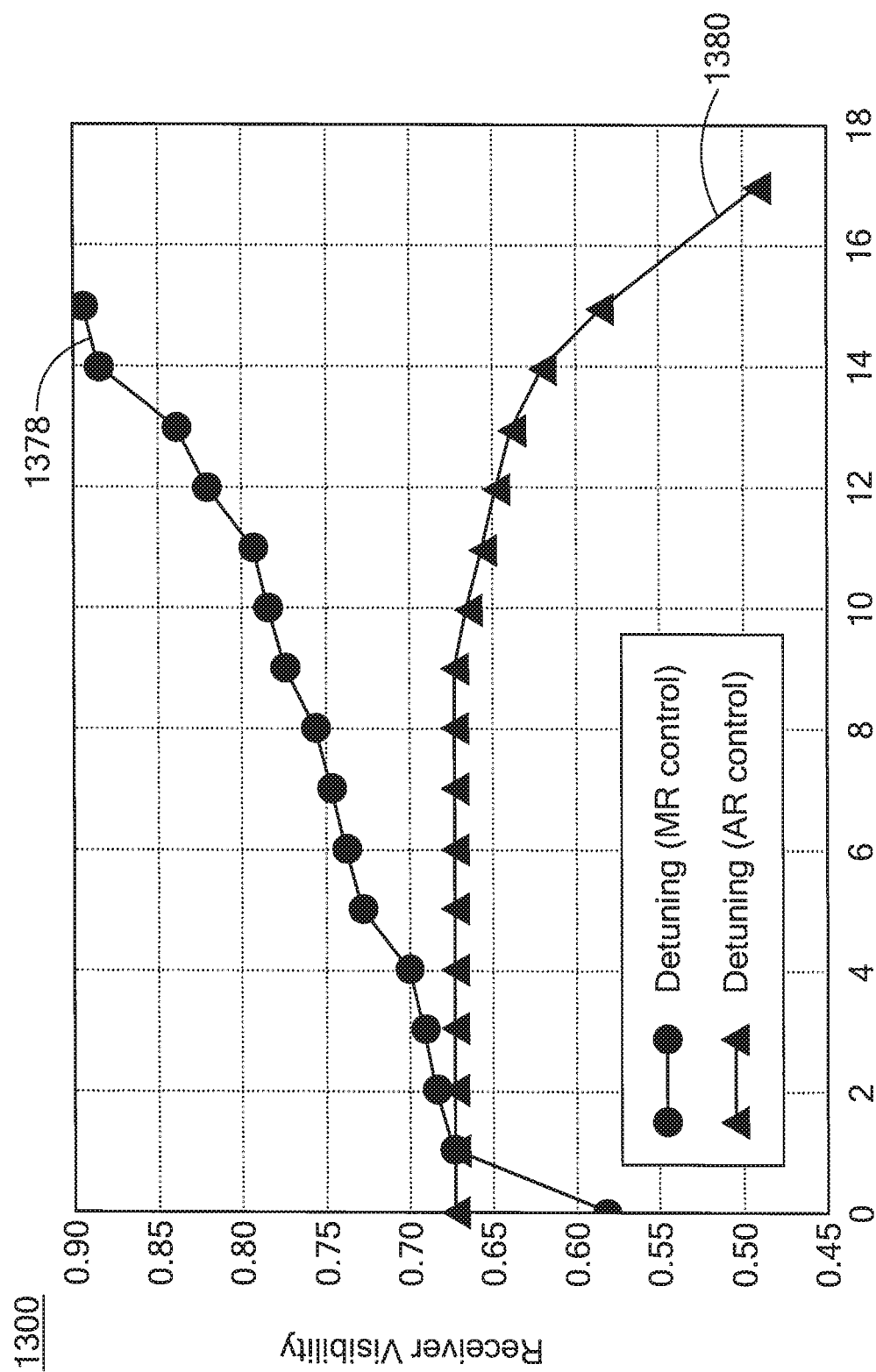
FIG. 13 is a plot representing a wireless receiver's visibility to a wireless charger vs. tuning input when main rectifier ("MR") control is used and when auxiliary rectifier ("AR") control is used.

FIG. 13 illustrates a plot 1300 representing a wireless receiver's visibility to a wireless charger vs. tuning input when main rectifier ("MR") 1378 control is used and when auxiliary rectifier ("AR") 1380 control is used. The amount of detuning can also be expressed in terms of the visibility of the receiver at the charger, which can be defined as the difference between charger's input DC power and the input power when there is no receiver present as a fraction of the latter. A plot of the receiver visibility at the charger is shown may be represented as $$Rx\ \text{Visibility} = \frac{\Delta P_{in, No\ Rx} - Pin}{Pin,\ No\ Rx}. \quad [EQ\ 11]$$

Figure 14:
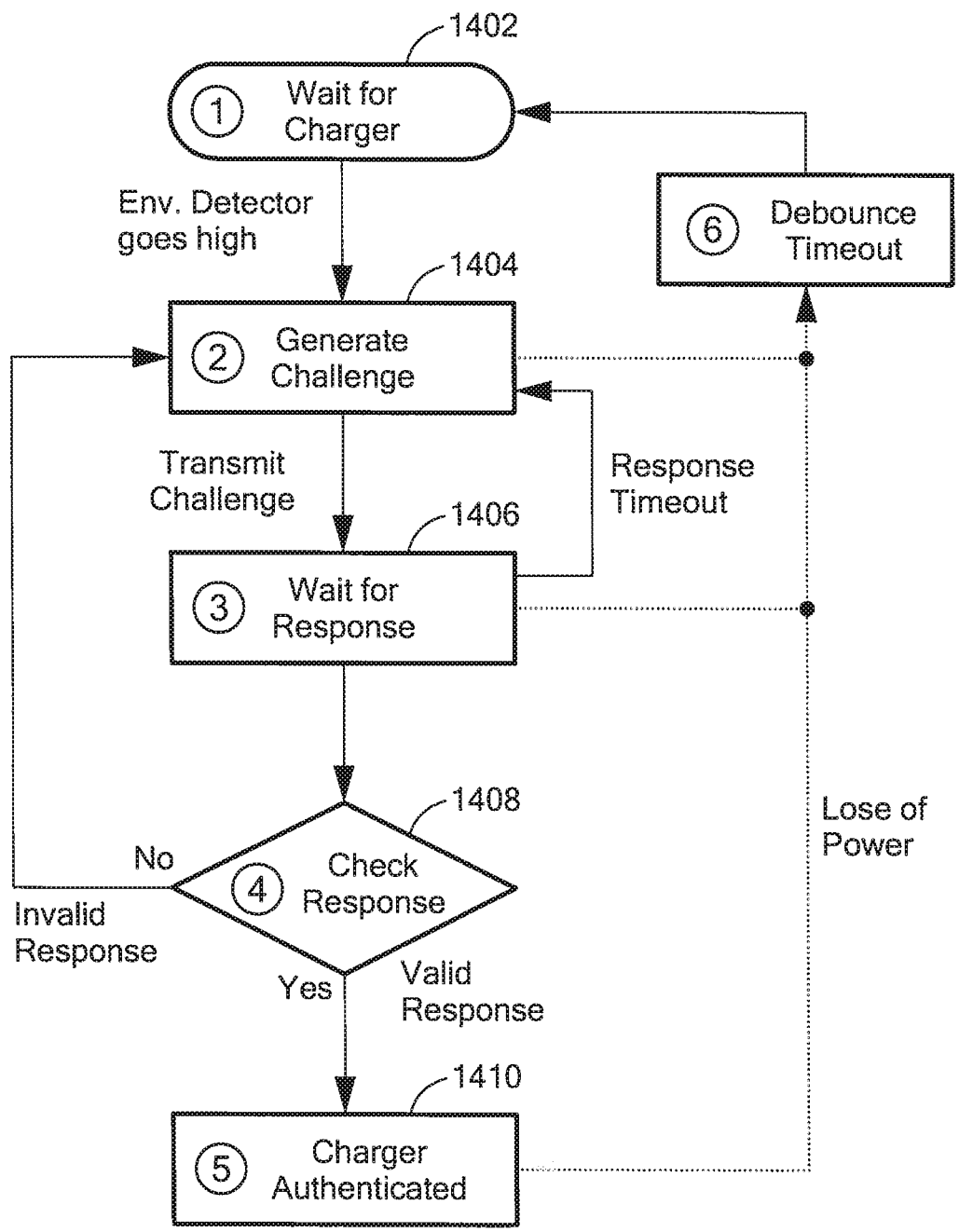
FIG. 14 is a flowchart representing a process 1400 for an authentication flow for a wireless receiver including an authentication engine.

FIG. 14 is a flowchart representing a process 1400 for an authentication flow for a wireless receiver including an authentication engine, according to some embodiments. At block 1402, the wireless receiver starts up in the fully detuned state with the auxiliary rectifier enabled and waits for a charger to come in range. At block 1404, when the envelope detector detects a wireless charger, the authentication engine on the receiver generates a challenge. At block 1406, the wireless receiver waits for a response from the wireless charger. According to some embodiments, the system may wait for a response for a determined amount of time. After the predetermined amount of time has elapsed, the system may move back to block 1402. Upon receiving a challenge, the wireless charger uses its private key to generate a response. At block 1408, the authentication engine checks the response received from the wireless charger to determine if the response is a valid response or an invalid response. When the response is a valid response (i.e. upon successful authentication) the system moves to block 1410 and the wireless receiver disables the auxiliary rectifier to commence resonant power transfer by modifying the duty cycle of the auxiliary rectifier, as discussed above in reference to FIG. 3. If the response is invalid, the system moves to block 1404 and a new challenge is generated.

In some embodiments, at block 1410, digital authentication engine generates an authentication acknowledgement that is then provided to duty-cycle control. The authentication acknowledgement includes a desired duty cycle that allows for charging between the wireless receiver and the wireless charger. For example, the desired duty cycle may comprise a duty cycle that alters the resonant frequency of the main inductive element of the wireless charger so that the resonant frequency of the main inductive element is effectively equal to the resonant frequency of an inductive element of the wireless charger. In other words, the desired duty cycle comprises a duty cycle that tunes the inductive element of the wireless receiver to the charging frequency.

When duty-cycle control receives the authentication acknowledgement, duty-cycle control is configured to select a predetermined $V_{ctrl}$ that corresponds to the desired duty cycle. Once the predetermined $V_{ctrl}$ is selected, duty-cycle control alters the duty cycle of the auxiliary rectifier of the wireless receiver to tune the main inductive element of the wireless receiver to a charging frequency. According to some embodiments, wireless receiver may include a memory configured to stored predetermined $V_{ctrl}$ associated with respective duty cycles. The memory may comprise a RAM, ROM, flash memory, programmable memory, or any combination thereof, to name a few examples.

Figure 14A:
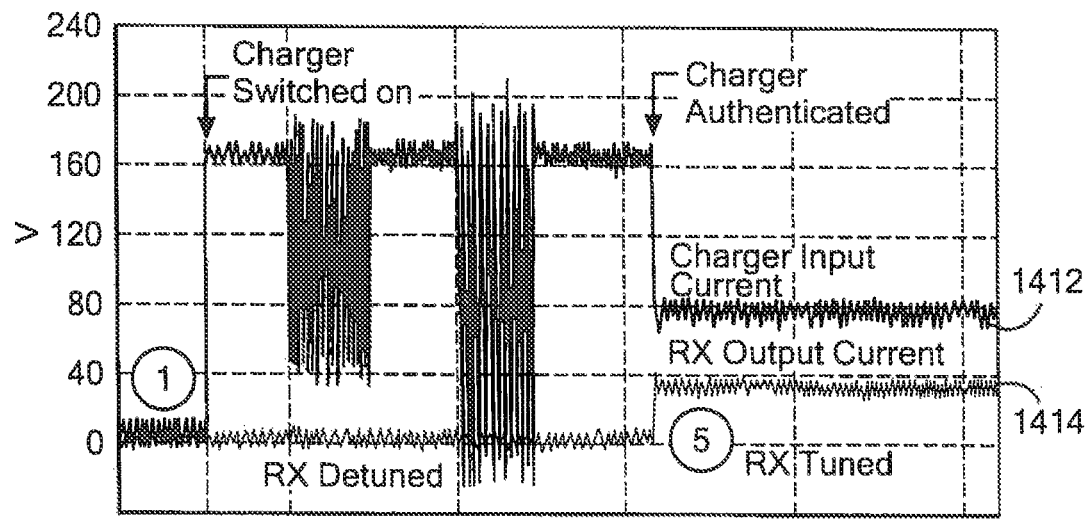
FIGS. 14A-C are plots representing signals provided by the authentication engine during process 1400.
Figure 14B:
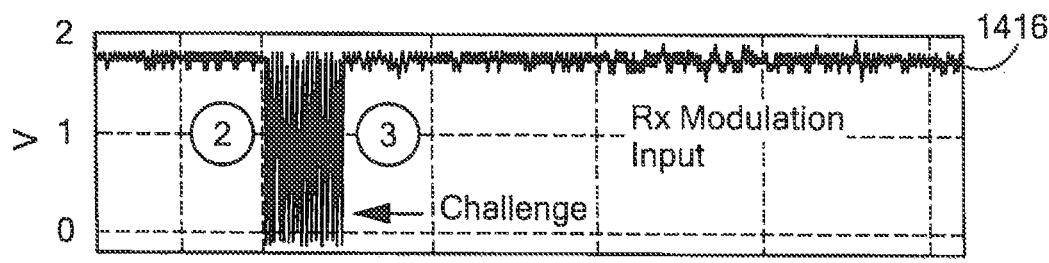
Figure 14C:
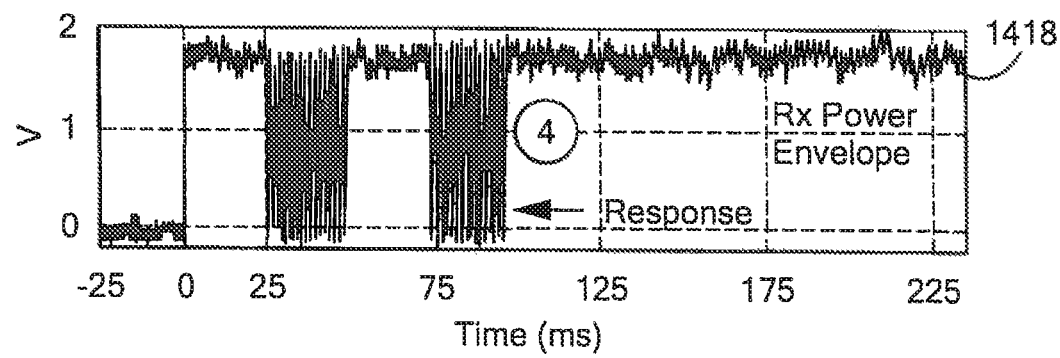

FIGS. 14A-C are a series of plots representing signals provided by the authentication engine during process 1400. FIG. 14A illustrates the input 1412 and output 1414 currents of a wireless receiver before and after authentication of a challenge has occurred vs. time. FIG. 14B illustrates the modulation input 1416 of a wireless receiver when a challenge is generated vs. time. FIG. 14C illustrates an output signal 1418 from the power envelope when a response from a wireless charger is receiver vs. time.

All publications and references cited herein are expressly incorporated herein by reference in their entirety.

What is claimed is:

1. A method for wireless power authentication comprising:
    emitting an authentication challenge from a main inductive element of a wireless receiver to a wireless charger proximate to the wireless receiver;
    validating a response from the wireless charger; and
    adjusting a resonant frequency of the main inductive element according to the validated response.

2. The method of claim 1, wherein the main inductive element is further configured to receive the response from the wireless charger.

3. The method of claim 1, wherein the main inductive element is wirelessly coupled to an auxiliary inductive element.

4. The method of claim 1, wherein adjusting the resonant frequency comprises:

adjusting an impedance presented to an auxiliary inductive element of the wireless receiver.

5. The method of claim 4, wherein adjusting the impedance comprises:
determining a duty cycle based upon the validated response; and
adjusting a duty cycle of a rectifier coupled to the auxiliary inductive element according to the determined duty cycle.

6. The method of claim 4, further comprising:
adjusting the impedance presented to the auxiliary inductive element to be effectively open when the response is valid.

7. The method of claim 4, further comprising:
adjusting the impedance presented to the auxiliary inductive element to be effectively closed when the response is invalid.

8. The method of claim 1, wherein a plurality of public keys is stored in the wireless receiver.

9. The method of claim 8, wherein the response comprises a comparison of at least one of the plurality of public keys to at least one of a plurality of private keys.

10. The method of claim 1, further comprising:
waiting for the response for a predetermined amount of time; and
emitting a second authentication challenge from the main inductive element of the wireless receiver to the wireless charger after the predetermined amount of time has elapsed.

11. The method of claim 1, wherein the wireless receiver further comprises an envelope detector.

12. The method of claim 11, further comprising:
detecting an output signal of the envelope detector to determine that the wireless charger is within a range of the wireless receiver.

13. A wireless power receiver for use within a wireless resonant inductive power transfer system, the wireless power receiver comprising:
a first inductive coil coupled to a digital authentication engine; and
a second inductive coil coupled to an auxiliary rectifier, wherein an impedance of the auxiliary rectifier is adjusted according to the digital authentication engine.

14. The wireless power receiver of claim 13, wherein the first inductive coil is physically larger than the second inductive coil.

15. The wireless power receiver of claim 13, wherein a resonant frequency of the first inductive coil is dependent upon the impedance of the auxiliary rectifier.

16. The wireless power receiver of claim 13, wherein the first inductive coil is configured to emit an authentication challenge generated by the digital authentication engine.

17. The wireless power receiver of claim 13, wherein the auxiliary rectifier is further coupled to a duty-cycle control circuit, wherein the duty-cycle control circuit is configured to adjust the duty cycle of the auxiliary rectifier.

18. The wireless power receiver of claim 17, wherein the duty-cycle control circuit is configured to adjust the duty cycle of the auxiliary rectifier according to an acknowledgement generated by the digital authentication engine.

19. The wireless power receiver of claim 13, wherein the digital authentication engine is configured to validate a response received at the first inductive coil.

20. The wireless power receiver of claim 13, further comprising an envelope detector, wherein the envelope detector is configured to demodulate a response received at the first inductive coil.

21. The wireless power receiver of claim 13, wherein the first inductive coil is one of a plurality of main inductive coils.

22. The wireless power receiver of claim 13, wherein the second inductive coil is one of a plurality of auxiliary inductive coils.

23. The wireless power receiver of claim 22, wherein a resonant frequency of the first inductive coil is based upon at least one impedance presented to at least one of the plurality of auxiliary inductive coils.

24. The wireless power receiver of claim 13, further comprising a communication engine configured to communicate to at least one other wireless power receiver.

25. The wireless power receiver of claim 13, further comprising a main rectifier coupled to the first inductive coil.

26. The wireless power receiver of claim 25, further comprising a load coupled to the main rectifier and the auxiliary rectifier, wherein the main rectifier and the auxiliary rectifier are configured to charge the coupled load.

27. The wireless power receiver of claim 26, further comprising a communication engine, wherein the communication engine is configured to provide a power need of the load to at least one other wireless receiver.

28. The wireless receiver of claim 27, wherein the at least one other wireless receiver is in proximity to a wireless charger.

* * * * *